(12) United States Patent
Tsai et al.

(10) Patent No.: US 12,039,519 B2
(45) Date of Patent: *Jul. 16, 2024

(54) SYSTEM AND METHOD FOR INDICATING ENTRY OF PERSONAL IDENTIFICATION NUMBER

(71) Applicant: STRIPE, INC., South San Francisco, CA (US)

(72) Inventors: Hwai Sian Tsai, Hong Kong (HK); Chi Wah Lo, Hong Kong (HK)

(73) Assignee: STRIPE, INC., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,620

(22) Filed: May 15, 2023

(65) Prior Publication Data

US 2023/0281600 A1  Sep. 7, 2023

Related U.S. Application Data

(63) Continuation of application No. 17/368,934, filed on Jul. 7, 2021, now Pat. No. 11,663,584, which is a
(Continued)

(51) Int. Cl.
*G06F 3/048* (2013.01)
*G06Q 20/34* (2012.01)
(Continued)

(52) U.S. Cl.
CPC ....... *G06Q 20/353* (2013.01); *G06Q 20/3829* (2013.01); *G06Q 20/4012* (2013.01)

(58) Field of Classification Search
CPC ............. G06Q 20/353; G06Q 20/3829; G06Q 20/4012; G06Q 20/341; G07F 7/1025
See application file for complete search history.

(56) References Cited

U.S. PATENT DOCUMENTS 5,128,672 A   7/1992  Kaehler
5,213,422 A   5/1993  Garfinkle
(Continued)

FOREIGN PATENT DOCUMENTS

CN   2010035502 Y     3/2008
CN    101601058 A  * 12/2009  ............. G06F 21/10
(Continued)

OTHER PUBLICATIONS

International Preliminary Report on Patentability received for PCT Patent Application No. PCT/CN2019/086235, mailed on Nov. 19, 2020, 5 pages.
(Continued)

*Primary Examiner* — Rashawn N Tillery
(74) *Attorney, Agent, or Firm* — Womble Bond Dickinson (US) LLP

(57) ABSTRACT

A system to indicate to a user to enter a personal identification number (PIN) on a commercial off the shelf (COTS) device, the system comprising: a secure card reader communicatively coupled to the COTS device, and wherein the secure card reader receives a payment card; a payment application installed on the COTS device; and one or more devices other than the COTS device. The payment application installed on the COTS device transmits one or more prompts to the one or more devices other than the COTS device based on a set of signals received from the secure card reader. The secure card reader transmits the set of signals after the payment card is received at the secure card reader, and the one or more prompts comprise at least one indication to the user to enter the PIN on a display of the COTS device.

20 Claims, 26 Drawing Sheets

Related U.S. Application Data continuation of application No. 16/540,666, filed on Aug. 14, 2019, now Pat. No. 11,062,299, which is a continuation-in-part of application No. PCT/CN2019/086235, filed on May 9, 2019, and a continuation-in-part of application No. 16/166,353, filed on Oct. 22, 2018, now Pat. No. 10,936,189.

(60) Provisional application No. 62/721,795, filed on Aug. 23, 2018, provisional application No. 62/668,866, filed on May 9, 2018, provisional application No. 62/576,401, filed on Oct. 24, 2017.

(51) Int. Cl.
*G06Q 20/38* (2012.01)
*G06Q 20/40* (2012.01)

(56) References Cited

U.S. PATENT DOCUMENTS

| | | | |
|---|---|---|---|
| 5,574,482 | A | 11/1996 | Niemeier |
| 5,708,709 | A | 1/1998 | Rose |
| 5,847,697 | A | 12/1998 | Sugimoto |
| 6,441,808 | B1 | 8/2002 | Hashimoto |
| 8,312,373 | B2 | 11/2012 | Kraft |
| 8,392,846 | B2 | 3/2013 | Carapelli |
| 8,397,988 | B1 | 3/2013 | Zuili |
| 8,627,224 | B2 | 1/2014 | Dahl |
| 8,643,617 | B2 | 2/2014 | Kim |
| 9,214,051 | B1 | 12/2015 | Newman |
| 9,268,364 | B2 | 2/2016 | Parker |
| 9,665,277 | B2 | 5/2017 | Luo |
| 9,754,126 | B2 | 9/2017 | Gellas |
| 9,778,841 | B2 | 10/2017 | Showering |
| 2003/0182558 | A1 | 9/2003 | Lazarro |
| 2005/0172137 | A1 | 8/2005 | Hopkins |
| 2005/0193208 | A1 | 9/2005 | Charrette |
| 2005/0253816 | A1 | 11/2005 | Himberg |
| 2006/0021024 | A1 | 1/2006 | Park |
| 2006/0039566 | A1 | 2/2006 | Stark et al. |
| 2006/0053301 | A1 | 3/2006 | Shin |
| 2006/0075397 | A1 | 4/2006 | Kasahara |
| 2006/0110203 | A1 | 5/2006 | Grafton |
| 2006/0132447 | A1 | 6/2006 | Conrad |
| 2006/0224523 | A1 | 10/2006 | Elvitigala |
| 2007/0174615 | A1 | 7/2007 | Ballou |
| 2008/0091944 | A1 | 4/2008 | Von Mueller |
| 2008/0114685 | A1 | 5/2008 | Leong et al. |
| 2008/0148186 | A1 | 6/2008 | Krishnamurthy |
| 2008/0189214 | A1 | 8/2008 | Mueller |
| 2008/0224897 | A1 | 9/2008 | Silva |
| 2008/0284744 | A1 | 11/2008 | Park |
| 2009/0079702 | A1 | 3/2009 | Colley |
| 2009/0091542 | A1 | 4/2009 | Inaba |
| 2010/0064212 | A1 | 3/2010 | Snyder |
| 2011/0006996 | A1 | 1/2011 | Smith |
| 2011/0102328 | A1 | 5/2011 | Chen |
| 2011/0254865 | A1 | 10/2011 | Yee |
| 2011/0260982 | A1 | 10/2011 | Trout |
| 2012/0047564 | A1 | 2/2012 | Liu |
| 2012/0104090 | A1 | 5/2012 | Gross |
| 2012/0235921 | A1 | 9/2012 | Laubach |
| 2012/0268393 | A1 | 10/2012 | Lee |
| 2012/0280923 | A1 | 11/2012 | Vincent |
| 2012/0323788 | A1 | 12/2012 | Keresman |
| 2013/0086389 | A1 | 4/2013 | Suwald |
| 2013/0127725 | A1 | 5/2013 | Sugimoto |
| 2013/0182015 | A1 | 7/2013 | Kuo |
| 2013/0234942 | A1 | 9/2013 | Yoo |
| 2013/0333011 | A1 | 12/2013 | Quigley |
| 2014/0078535 | A1 | 3/2014 | Okada |
| 2014/0098141 | A1 | 4/2014 | Sen |
| 2014/0108793 | A1 | 4/2014 | Barton |
| 2014/0248853 | A1 | 9/2014 | Shipley |
| 2014/0283092 | A1 | 9/2014 | Mowatt |
| 2014/0324708 | A1 | 10/2014 | McCauley |
| 2015/0006407 | A1 | 1/2015 | Lunn |
| 2015/0046323 | A1 | 2/2015 | Blythe |
| 2015/0046338 | A1 | 2/2015 | Laxminarayanan |
| 2015/0058761 | A1 | 2/2015 | Cai |
| 2015/0109207 | A1 | 4/2015 | Li |
| 2015/0137944 | A1 | 5/2015 | Fuerth |
| 2015/0235024 | A1 | 8/2015 | Corrion |
| 2015/0310199 | A1 | 10/2015 | Patel |
| 2015/0324800 | A1 | 11/2015 | Kapur |
| 2016/0048706 | A1 | 2/2016 | Menet et al. |
| 2016/0065562 | A1 | 3/2016 | Guo |
| 2016/0078434 | A1 | 3/2016 | Huxham |
| 2016/0094737 | A1 | 3/2016 | Sugiura |
| 2016/0234625 | A1 | 8/2016 | Wang |
| 2016/0306958 | A1 | 10/2016 | Dow |
| 2017/0076099 | A1 | 3/2017 | Yao et al. |
| 2017/0116424 | A1 | 4/2017 | Aamir |
| 2017/0235962 | A1 | 8/2017 | Clark |
| 2017/0293769 | A1 | 10/2017 | Quinlan et al. |
| 2017/0293776 | A1 | 10/2017 | Bolignano |
| 2018/0285547 | A1 | 10/2018 | Tsou |
| 2018/0365382 | A1 | 12/2018 | Bhuiya |
| 2019/0334718 | A1 | 10/2019 | Li et al. |
| 2019/0347414 | A1 | 11/2019 | El-Moussa |
| 2019/0362334 | A1 | 11/2019 | Wang |
| 2020/0280559 | A1 | 9/2020 | Wu et al. |
| 2022/0270064 | A1 | 8/2022 | Cat |

FOREIGN PATENT DOCUMENTS

| | | | | |
|---|---|---|---|---|
| CN | 102422302 | A | 4/2012 | |
| CN | 103425944 | A | 12/2013 | |
| CN | 104054098 | A | 9/2014 | |
| CN | 106304040 | A | 1/2017 | |
| CN | 106462428 | A | 2/2017 | |
| CN | 106709382 | A | 5/2017 | |
| CN | 106980801 | A | 7/2017 | |
| CN | 106991306 | A | 7/2017 | |
| EP | 3677005 | B1 | 3/2021 | |
| JP | 4616013 | B2 | 1/2011 | |
| WO | WO-2005013127 | A1 | * 2/2005 | ......... H04N 21/2351 |
| WO | 2016188231 | A1 | 12/2016 | |

OTHER PUBLICATIONS

Lili Yu et al.; The Application of Hybrid Encryption Algorithm in Software Security; IEEE; pp. 762-765; retrieved on May 24, 2023 (Year: 2012).

Patent Cooperation Treaty: CN International Searching Authority; International Search Report and Written Opinion for PCT/CN2018/111603 ; Liu, Ke; dated Jan. 30, 2019; 10 pages.

Patent Cooperation Treaty: International Search Report and Written Opinion of PCT/CN2019/102299 (related application), dated Nov. 25, 2019, 9 pages.

PCI Security Standards Council, Payment Card Industry (PCI) Software-Based PIN Entry on COTS Security Requirements Version 1.0, https://www.pcisecuritystandards.org, Jan. 31, 2018 (Jan. 31, 2018).

Utsav Banerjee et al.; An Energy-Efficient Reconfigurable DTLS Cryptographic Engine for Securing Internet-of-Things Applications; IEEE; pp. 2339-2352; retrieved on May 24, 2023 (Year: 2019).

National Intellectual Property Administration; The First Office Action of CN App No. 201980069631X; (related application); Zheng, Wenxiao Feb. 11, 2022; 19 pages.

Payment Card Industry (PCI) Software-based PIN Entry on COTS Security Requirements Version 1.0; PCY Security Standards Council, LLC; Apr. 2018; 58 pages. Http://www.pcisecuritystandards.org.

Patent Cooperation Treaty: CN International Searching Authority; International Search Report and Written Opinion for PCT/CN2018/111603; Liu, Ke; Jan. 30, 2019; 10 pages.

Patent Cooperation Treaty: CN International Searching Authority; International Search Report and Written Opinion for PCT/CN2019/086235; Jiang, Li; Jul. 26, 2019; 9 pages.

(56) References Cited

OTHER PUBLICATIONS

Patent Cooperation Treaty: International Search Report and Written Opinion for PCT/CN2019/086235; Li, Jiang; Jul. 26, 2019; 6 pages.
Patent Cooperation Treaty: International Search Report and Written Opinion of PCT/CN2019/102299 (related application), Nov. 25, 2019; 9 pages.

* cited by examiner

FIG. 2F

TABLE 2F-00

| Sandbox Class | For (column 2F-04) | Security Objective (column 2F-05) | Control Means (column 2F-06) |
|---|---|---|---|
| A (row 2F-01) | Payment APP (2F-01, 2F-04) | Allowed access to sensitive data and functions (2F-01, 2F-05) | Relatively loosely restricted sandbox. (2F-01, 2F-06) |
| B (row 2F-02) | Non-Payment APP (2F-02, 2F-04) | No access to sensitive data and functions (2F-02, 2F-05) | block sensitive services and data in addition to sandbox restrictions for class A apps. (2F-02, 2F-06) |
| C (row 2F-03) | Unauthorized APP (2F-03, 2F-04) | Not able to ask card holder to disclose account data and PIN in addition to security objective for class B apps (2F-03, 2F-05) | Warns card holder not to enter account data and PIN regardless of what the app prompt says in addition to sandbox restrictions for class B apps. (2F-03, 2F-06) |

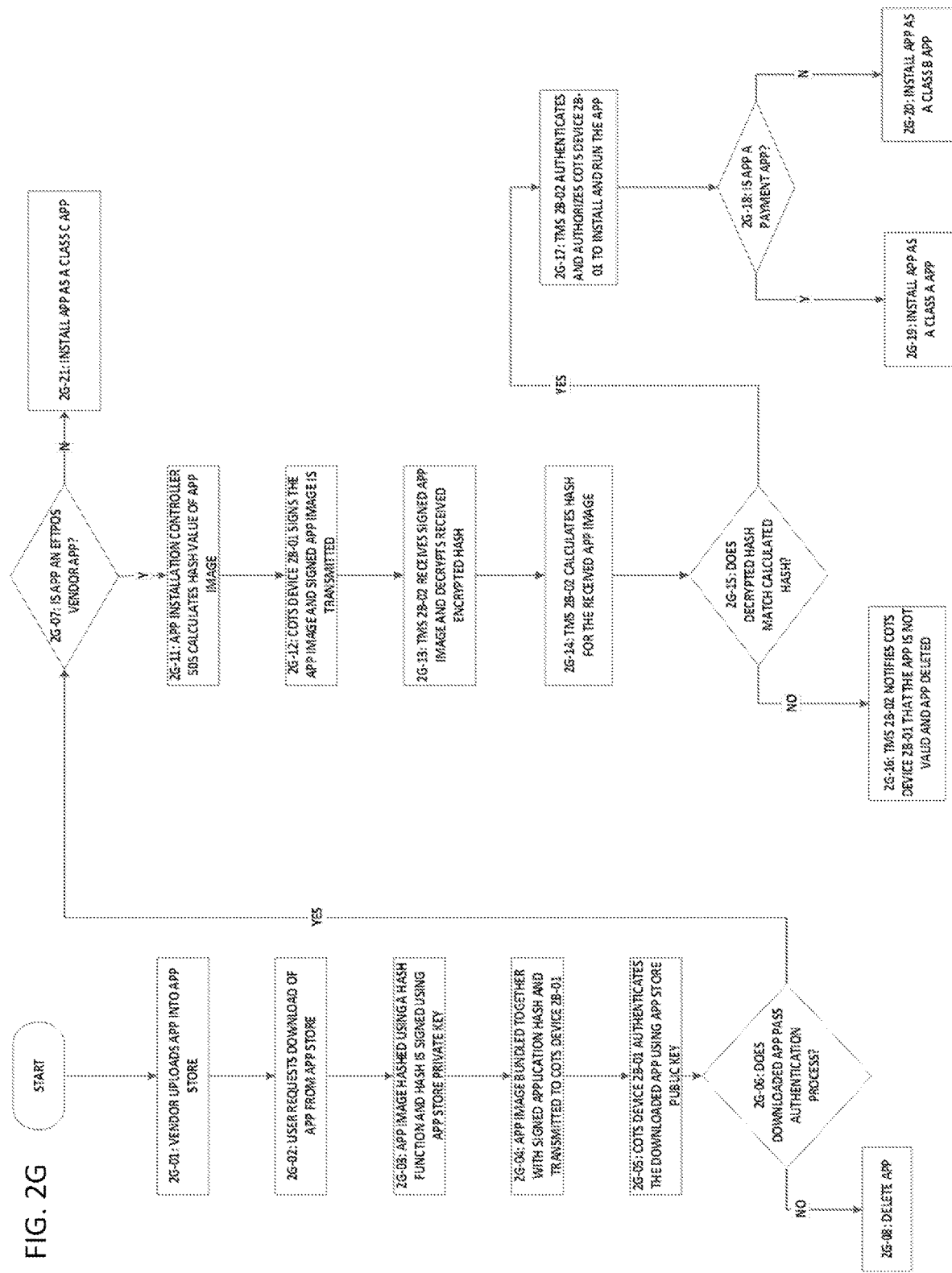

FIG. 7H

|  | 7C-14-1 | 7C-14-2 | 7C-14-3 |  |
|---|---|---|---|---|
| 7H-01-3 | 1 | 2 | 3 | 7C-09-4 |
| 7H-01-2 | 4 | 5 | 6 | 7C-09-3 |
| 7H-01-1 | 7 | 8 | 9 | 7C-09-2 |
| 7H-01-0 |  | 0 |  | 7C-09-1 |
|  | 7H-11-0 | 7H-11-1 | 7H-11-2 |  |

FIG. 7I

|  | 7C-09-3 | 7C-09-2 | 7C-09-1 | 7C-09-4 |  |
|---|---|---|---|---|---|
| 7C-14-3 | 6 | 9 |  | 3 | 7H-11-2 |
| 7C-14-2 | 5 | 8 | 0 | 2 | 7H-11-1 |
| 7C-14-1 | 4 | 7 |  | 1 | 7H-11-0 |
|  | 7H-01-3 | 7H-01-2 | 7H-01-1 | 7H-01-0 |  |

|          | 7C-09-4 | 7C-09-3 | 7C-09-2 | 7C-09-1 |          |
|----------|---------|---------|---------|---------|----------|
| 7C-14-2  | 2       | 5       | 8       | 0       | 7H-11-2  |
| 7C-14-1  | 1       | 4       | 7       |         | 7H-11-1  |
| 7C-14-3  | 3       | 6       | 9       |         | 7H-11-0  |
|          | 7H-01-3 | 7H-01-2 | 7H-01-1 | 7H-01-0 |          |

FIG. 7J

|  | 7C-09-4 | 7C-09-3 | 7C-09-2 | 7C-09-1 |  |
|---|---|---|---|---|---|
| 7C-14-1 | 1 | 4 | 7 |  | 7H-11-2 |
| 7C-14-2 | 2 | 5 | 8 | 0 | 7H-11-1 |
| 7C-14-3 | 3 | 6 | 9 |  | 7H-11-0 |

FIG. 7K

|         | 7C-09-1 | 7C-09-2 | 7C-09-3 | 7C-09-4 |         |
|---------|---------|---------|---------|---------|---------|
| 7C-14-3 |         | 9       | 6       | 3       | 7H-11-2 |
| 7C-14-2 | 0       | 8       | 5       | 2       | 7H-11-1 |
| 7C-14-1 |         | 7       | 4       | 1       | 7H-11-0 |
|         | 7H-01-3 | 7H-01-2 | 7H-01-1 | 7H-01-0 |         |

FIG. 7L

SYSTEM AND METHOD FOR INDICATING ENTRY OF PERSONAL IDENTIFICATION NUMBER

CROSS-REFERENCE TO RELATED APPLICATIONS

This application is a continuation of U.S. patent application Ser. No. 17/368,934, filed Jul. 7, 2021, entitled SYSTEM AND METHOD FOR INDICATING ENTRY OF PERSONAL IDENTIFICATION NUMBER, which is a continuation of U.S. patent application Ser. No. 16/540,666, filed Aug. 14, 2019, entitled SYSTEM AND METHOD FOR INDICATING ENTRY OF PERSONAL IDENTIFICATION NUMBER, which is a continuation-in-part of Patent Cooperation Treaty Application No. PCT/CN2019/086235 to Tsai et al., filed May 9, 2019 and entitled SYSTEM AND METHOD FOR CONFIGURATION OF TERMINAL HARDWARE, which claims the benefit of U.S. Provisional Patent Application No. 62/668,866 to Tsai et al., filed May 15, 2018, entitled SYSTEM AND METHOD FOR CONFIGURATION OF TERMINAL HARDWARE, the specifications of which are incorporated herein by reference in their entirety. This application also is a continuation-in-part of U.S. patent application Ser. No. 16/166,353 to Tsai et al., filed Oct. 22, 2018 entitled SYSTEM AND METHOD FOR A KEYPAD ON A TOUCH SCREEN DEVICE, which claims the benefit of U.S. Provisional Patent Application No. 62/576,401, to Tsai et al, filed Oct. 24, 2017, entitled SYSTEM AND METHOD FOR A KEYPAD ON A TOUCH SCREEN DEVICE, the specifications of which are incorporated herein by reference in their entirety. This application also claims the benefit of U.S. Provisional Patent Application No. 62/721,795 to Tsai et al, filed Aug. 23, 2018, entitled SYSTEM AND METHOD FOR INDICATING ENTRY OF PERSONAL IDENTIFICATION NUMBER, the specification of which is incorporated herein by reference in its entirety.

TECHNICAL FIELD

The present disclosure relates to software-based personal identification number (PIN) entry on commercial off-the-shelf (COTS) devices.

BACKGROUND

In payment processes which utilize payment cards, usually the identification of the cardholder has to be verified. The following Cardholder Verification (CV) methods are usually used:
Signature verification, that is, where the cardholder signs his or her name on a piece of paper (on a receipt or an invoice), or
Personal Identification Number (PIN) verification, that is, where the cardholder enters his or her PIN on a secure PIN pad.

Typically an authentication process is based on the following 3 factors, or answering the following questions:
What I know, or the knowledge factor;
What I have, or the possession factor; and
What I am, or the inherence factor.

In a transaction which utilizes a PIN, the payment involves submitting
the payment card, which is an example of a possession factor; and
the PIN, which is an example of a knowledge factor.

These two factors form what is called a two-factor authentication which is a measure to protect against card fraud.

Because the PIN is a very sensitive piece of information, typically the pad used to enter PINs is a specialized hardware device which is highly secured against tampering or attempts to steal the PIN from its legitimate owner.

Initially, payment cards only had magnetic stripes. These could be read easily making it easy to counterfeit. This increased the attractiveness of PIN-based payment cards. Because of this, the importance of protection on PIN has become of paramount importance.

In recent years, the introduction of chip-based payment cards has greatly improved the security of payment cards. In particular, the Europay Mastercard Visa (EMV) chip card standard has become the international standard.

The migration from magnetic stripe cards to EMV payment cards has been a long process having varying progress in different countries. It is likely that in the near future, all payment cards will be moving to the EMV standards.

Recently, the Payment Card Industries Security Standards Council (PCI SSC) announced a new PCI Security Standard for software-based PIN entry on commercial off-the-shelf (COTS) devices. This standard is known as the Software-based PIN entry on Commercial Off The Shelf (SPoC) standard. The SPoC standard provides guidelines for PIN entry on a touch screen of a mobile phone or tablet without needing a physical secure PIN pad. It is also loosely referred to as PIN on Mobile (PoM) or PIN on Glass (PoG).

Typically in a system that would utilize PoM or PoG, the user can see the following:
  a special card reader that he/she feels to be secure, as he/she know it is a special device that he/she seen in many stores/merchants and he/she cannot buy elsewhere; and
  a COTS device that he/she is very familiar with, as it is a device he/she can buy anywhere, which may make him/her not that confident that the device is really capable of being used for the card transaction purpose.

As a consequence it may be difficult for the user to know whether the COTS device is genuine, and whether the user is safe in entering his/her confidential PIN.

There is therefore a need for a solution to give the user some degree of comfort and security before entering his or her PIN.

SUMMARY

A system to indicate to a user to enter a personal identification number (PIN) on a commercial off the shelf (COTS) device, said system comprising: a secure card reader coupled to the COTS device via a connection, and wherein the secure card reader receives a payment card; a payment application installed on the COTS device; and one or more devices other than the COTS device, wherein the payment application installed on the COTS device transmits one or more prompts to the one or more devices other than the COTS device based on a set of signals received from the secure card reader, further wherein the secure card reader transmits the set of signals after the payment card is received at the secure card reader, and wherein said one or more prompts comprise at least one indication to the user to enter the PIN on a display of the COTS device.

A method to indicate to a user to enter a personal identification number (PIN) on a commercial off the shelf (COTS) device, said method comprising: receiving a payment card on a secure card reader coupled to the COTS device; and transmitting, by a payment application running on the COTS device, one or more prompts to one or more devices other than the COTS device after said receiving, wherein said one or more prompts comprise at least one indication to the user to enter the PIN on a display of the COTS device.

BRIEF DESCRIPTION OF THE DRAWINGS

For a more complete understanding, reference is now made to the following description taken in conjunction with the accompanying Drawings in which:

FIG. 2F illustrates an example of segregation of an application into different classes and utilization of application level sandboxes in accordance with various embodiments of this disclosure;

FIG. 2G illustrates an example of a method for vendor upload of applications incorporating classification of applications for different sandboxes in accordance with various embodiments of this disclosure;

FIG. 7H illustrates a starting position for a keypad in accordance with various embodiments of this disclosure;

FIG. 7I illustrates an example of rolling up rows on a keypad in accordance with various embodiments of this disclosure;

FIG. 7J illustrates an example of flipping columns on a keypad in accordance with various embodiments of this disclosure;

FIG. 7K illustrates an example of a left to right mirrored keypad in accordance with various embodiments of this disclosure;

FIG. 7L illustrates an example of a vertically mirrored keypad in accordance with various embodiments of this disclosure;

DETAILED DESCRIPTION

Figure 1:
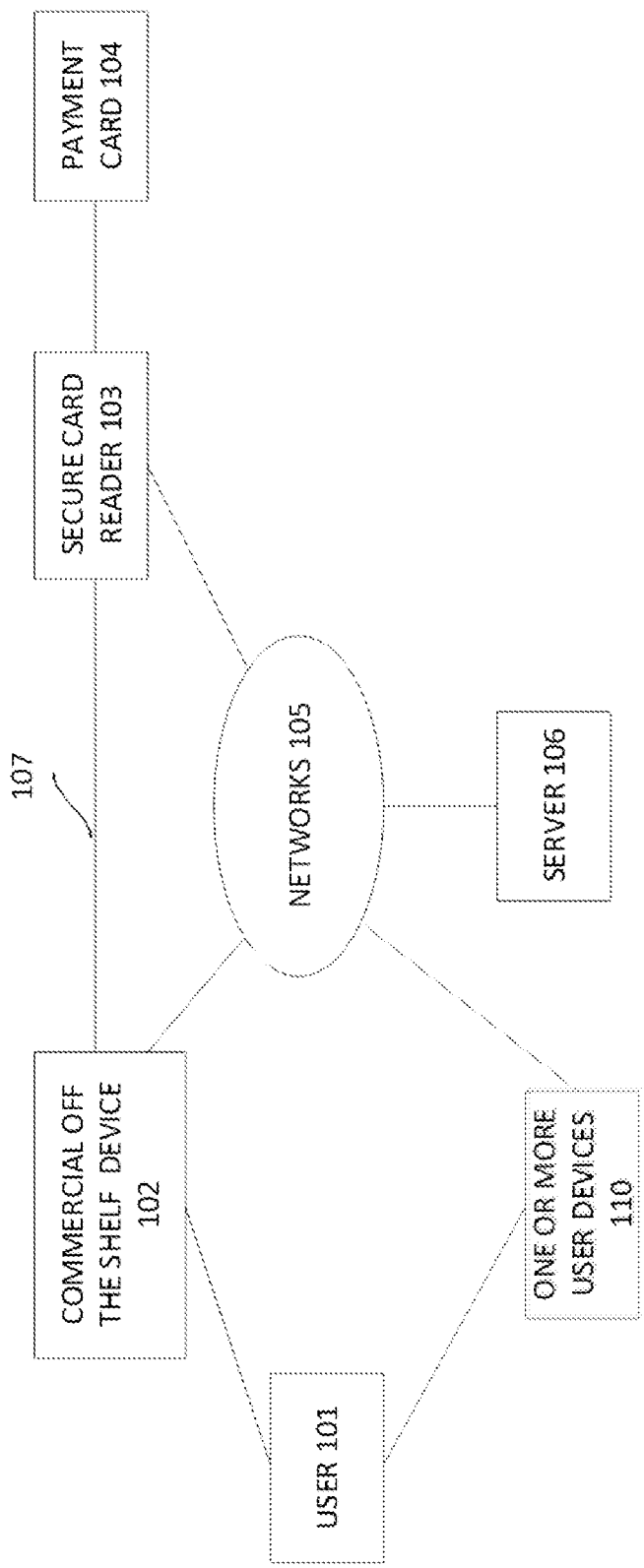
FIG. 1 illustrates an example of a system to enable seamless transition for PIN entry in accordance with various embodiments of this disclosure.

Referring now to the drawings, wherein like reference numbers are used herein to designate like elements throughout, the various views and embodiments of a system and method for indicating entry of personal identification number are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

A system and method to reduce discontinuities and present a seamless transition from a payment application or "app" to the CV application is detailed below.

FIG. 1 illustrates an example of a system to enable seamless transition for PIN entry in accordance with various embodiments of this disclosure. User 101 interfaces with commercial off the shelf (COTS) device 102 to, for example, make payments. COTS device 102 is, for example, a smartwatch, smartphone, tablet, laptop, or any appropriate computing and network-enabled device.

Figure 2A:
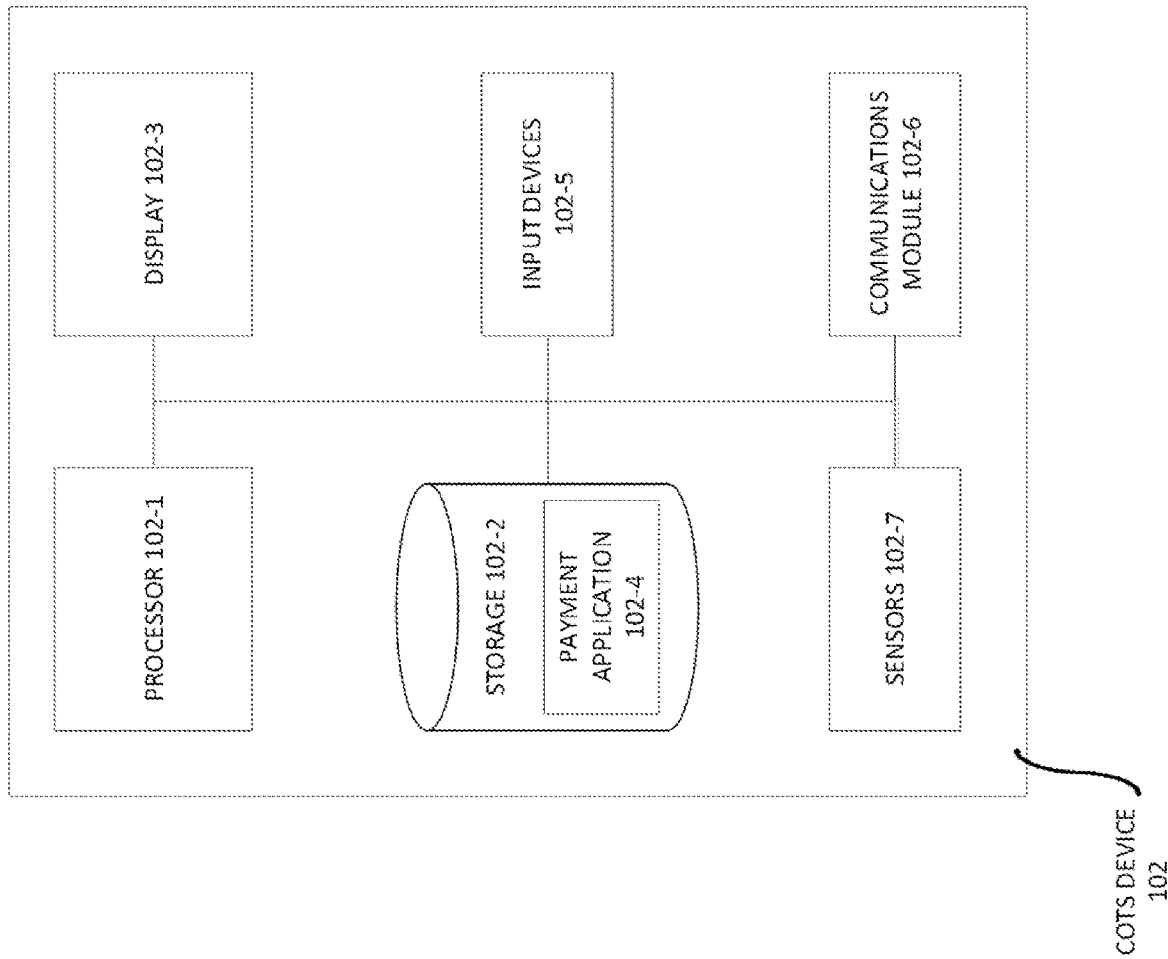
FIG. 2A illustrates an example of a COTS device in accordance with various embodiments of this disclosure.

An example of COTS device 102 is shown in FIG. 2A. Processor 102-1 performs processing functions and operations necessary for the operation of COTS device 102, using data and programs stored in storage 102-2. An example of such a program is payment application 102-4. Display 102-3 performs the function of displaying data and information for user 101. Input devices 102-5 allow user 101 to enter information. This includes, for example, devices such as a touch screen, mouse, keypad, keyboard, microphone, camera, video camera and so on. In some embodiments, display 102-3 is a touchscreen which means it is also part of input devices 102-5. Communications module 102-6 allows COTS device 102 to communicate with devices and networks external to COTS device 102. This includes, for example, communications via BLUETOOTH®, Wi-Fi, Near Field Communications (NFC), Radio Frequency Identification (RFID), 3G, Long Term Evolution (LTE), Universal Serial Bus (USB) and other protocols known to those of skill in the art. Sensors 102-7 perform functions to sense or detect environmental or locational parameters. Sensors 102-7 include, for example, accelerometers, gyroscopes, magnetometers, barometers, Global Positioning System (GPS), proximity sensors and ambient light sensors. The components of COTS device 102 are coupled to each other as shown in FIG. 2A.

Returning to FIG. 1, secure card reader 103 is communicatively coupled to COTS device 102 via either connection 107 or networks 105. In certain embodiments, secure card reader 103 is coupled to server 106 via networks 105. Secure card reader 103 is functional to read payment cards such as payment card 104. Payment card 104 is, for example, a credit card or a debit card. In some embodiments, payment card 104 has a chip, such as an EMV chip. In yet other embodiments, payment card 104 has a magnetic stripe. In yet other embodiments, payment card 104 is enabled for near field communications (NFC).

In some embodiments, secure card reader 103 is able to read payment cards having magnetic stripes, chips, and NFC capabilities.

Networks 105 can be implemented using a variety of networking and communications technologies. In some embodiments, networks 105 are implemented using wired technologies such as Firewire, Universal Serial Bus (USB), Ethernet and optical networks. In some embodiments, networks 105 are implemented using wireless technologies such as WiFi, BLUETOOTH®, NFC, 3G and LTE. In some embodiments, networks 105 are implemented using satellite communications links. In some embodiments, the communication technologies stated above include, for example, technologies related to a local area network (LAN), a campus area network (CAN) or a metropolitan area network (MAN). In yet other embodiments, networks 105 are implemented using terrestrial communications links. In some embodiments, networks 105 comprise at least one public network. In some embodiments, networks 105 comprise at least one private network. In some embodiments, networks 105 comprise one or more subnetworks. In some of these embodiments, some of the subnetworks are private. In some of these embodiments, some of the subnetworks are public. In some embodiments, communications within networks 105 are encrypted.

As explained above, COTS device 102 is coupled to secure card reader 103 via, for example, connection 107 or networks 105. Connection 107 is implemented using technologies which enable communicative coupling between COTS device 102 and secure card reader 103. Examples of connection 107 include:

A connection via an audio jack on COTS device 102,
A connection via a Universal Serial Bus (USB) or Firewire connection on COTS device 102,
BLUETOOTH® connection,
NFC connection, and
Wi-Fi connection.

Server 106 performs back-end processing as necessary. This back-end processing is performed to facilitate, for example, payment flows and cardholder verification. As previously stated, in some embodiments server 106 is coupled to secure card reader 103 via networks 105. In some embodiments, server 106 is coupled to COTS device 102 via networks 105. Server 106 can be implemented in a variety of ways. In some embodiments, server 106 is implemented using a single server. In other embodiments, server 106 is implemented using a plurality of devices. In some embodiments, server 106 is implemented using some combination of hardware and software. In yet other embodiments, server 106 is implemented in a distributed fashion, whereby the components of server 106 are situated at one or more locations.

Additionally, the user has one or more user devices 110 associated with the user. These include, for example, smartwatches, smartphones, tablets, laptops, desktops or any appropriate computing and network-enabled device. In some embodiments, these one or more user devices 110 are communicatively coupled to networks 105 so as to transmit communications to, and receive communications from networks 105.

Payment application 102-4 of FIG. 2A will now be discussed in more detail. Payment application 102-4 is functional to implement a payment process for a vendor. It serves to accept price inputs, calculate price totals and so on. In some embodiments, it also performs functions such as displaying a PIN pad for the user to enter a PIN. It also interacts with secure card reader 103 as necessary and transmits prompts to other devices and to other components of FIG. 1 such as server 106 as necessary.

In some embodiments, the payment application 102-4 is downloaded and installed on COTS device 102 using a secure process for application installation and updating as described in Patent Cooperation Treaty Application No. PCT/CN2019/086235 to Tsai et al, filed May 9, 2019.

Figure 2B:
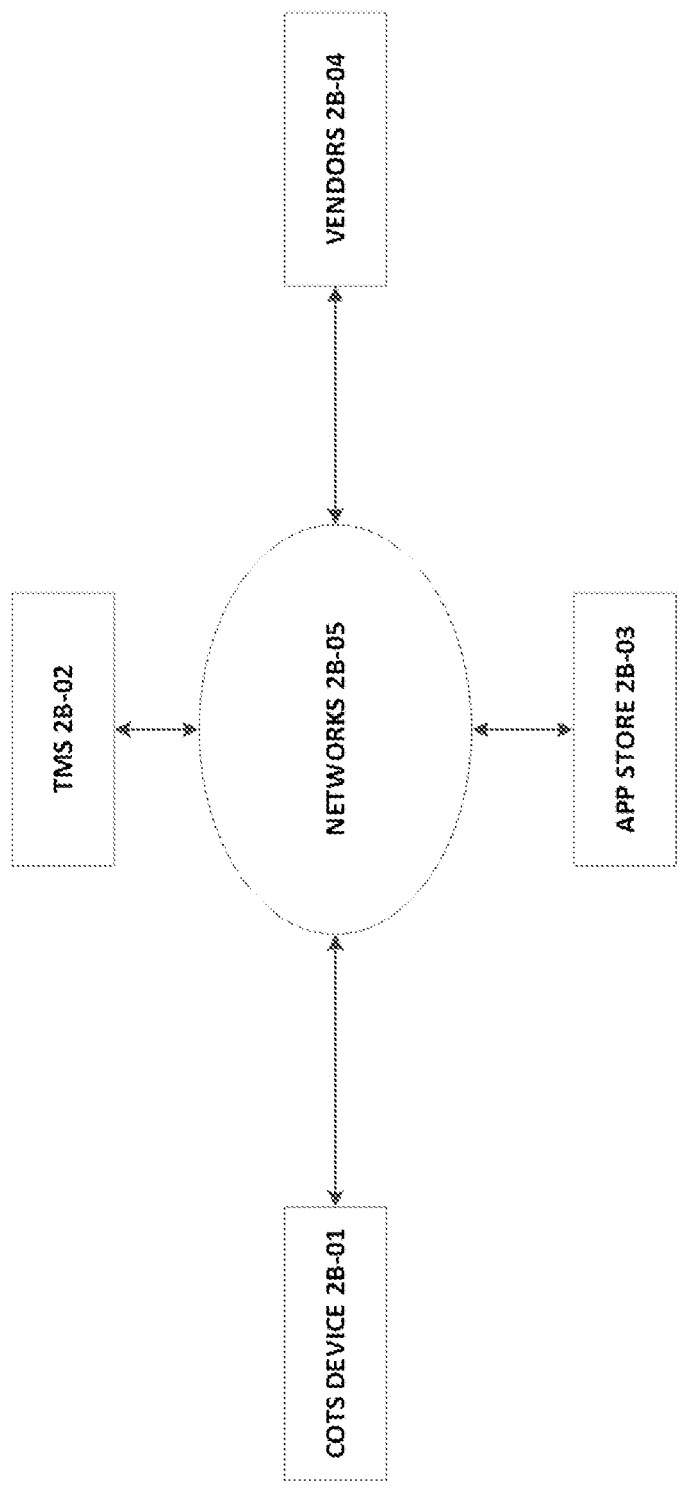
FIG. 2B illustrates an example of downloading and installing a payment application on a COTS device using a secure process for application installation and updating in accordance with various embodiments of this disclosure.
Figure 2C:
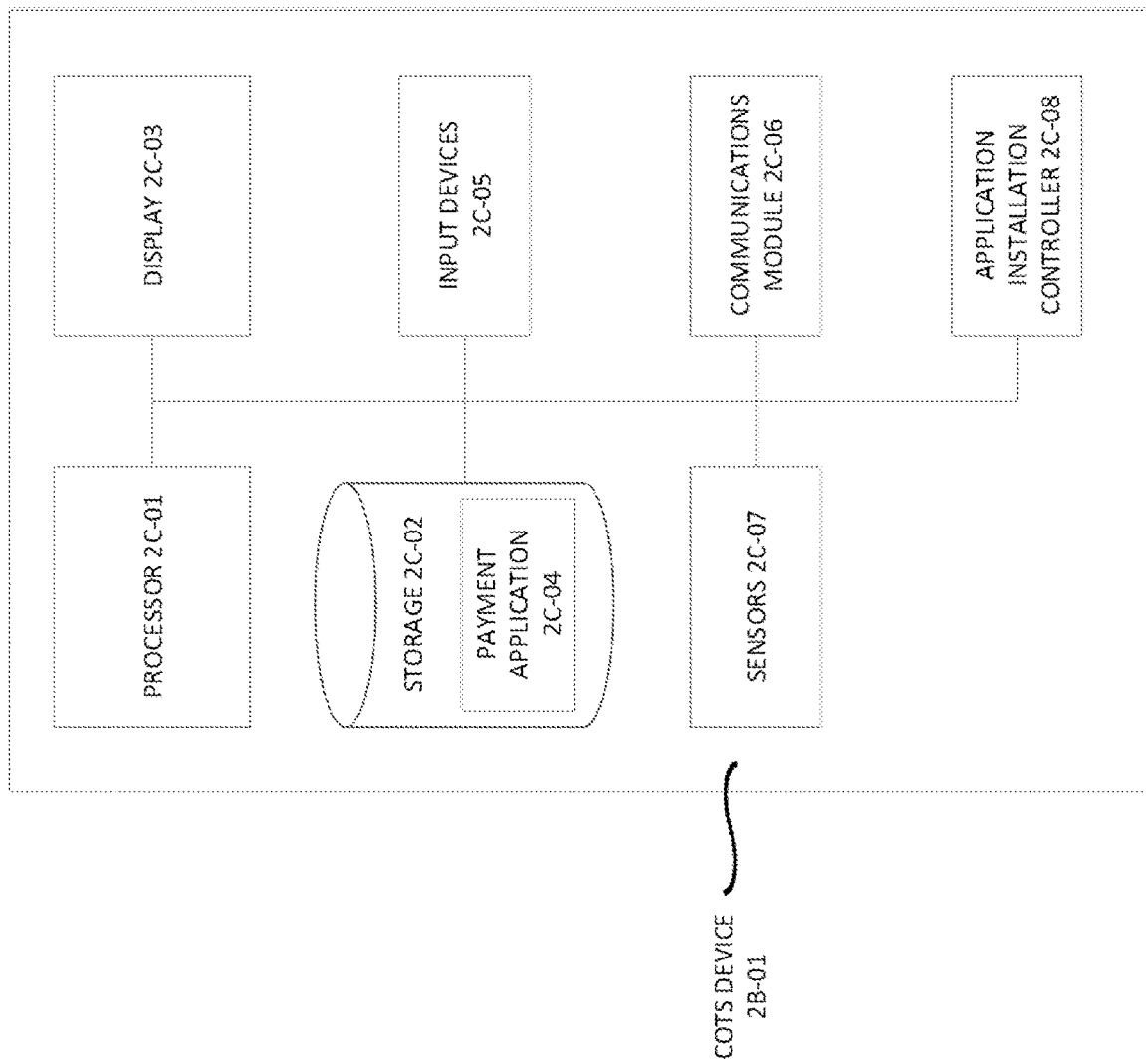
FIG. 2C illustrates an example of a COTS device incorporating an application installation controller in accordance with various embodiments of this disclosure.

An example of such a process is described below with reference to FIGS. 2B to 2G. In FIG. 2B, COTS device 2B-01 is similar to COTS device 102 and includes an additional application installation controller. A detailed example of COTS device 2B-01 is shown in FIG. 2C. Components 2C-01 to 2C-07 are similar to components 102-1 to 102-7 of COTS device 102 respectively. Additionally, COTS device 2B-01 comprises application or "app" installation controller 2C-08 for installation of payment application 2C-04 which is similar to payment application 102-4. This will be described in further detail below.

COTS device 2B-01 is also coupled to terminal management server (TMS) 2B-02 via network 2B-05, which is similar to networks 105. TMS 2B-02 performs the functions of acquiring and processing payment transactions from COTS device 2B-01, and communicating with COTS device 2B-01 to perform identification, verification, authorization and authentication functions. TMS 2B-02 receives and transmits information and also performs encryption and decryption as necessary. In some embodiments, communications between TMS 2B-02 and COTS device 2B-01 are performed using encrypted channels.

Application or "app" store 2B-03 stores one or more apps and allows apps to be uploaded from vendors 2B-04. Apps are distributed from app store 2B-03 to COTS device 2B-01.

All of these components are communicatively coupled to each other by networks 2B-05, which as explained previously is similar to networks 105.

As explained above, in some embodiments, TMS 2B-02 and COTS device 2B-01 communicate with each other over networks 2B-05 using encrypted channels. Examples of encryption techniques used include:

symmetric encryption techniques, such as those based on shared secrets, and
asymmetric encryption techniques.

In some embodiments, COTS device 2B-01 communicates with TMS 2B-02 to indicate to TMS 2B-02 that it wants to install and run an app. The TMS 2B-02 then performs the following functions:

Granting of authorization for COTS device 2B-01 to install and run the app, and
Vendor-based authentication for COTS device 2B-01 to install and run the app.

The communications necessary to perform these functions are, as explained previously, encrypted.

Therefore, since only authorized devices would be able to communicate with the TMS 2B-02 using an encrypted channel, this alleviates the concern of payment apps running on unauthorized devices such as generic smart devices. This also removes the need for extra authorization mechanisms such as out-of-band license keys.

Figure 2D:
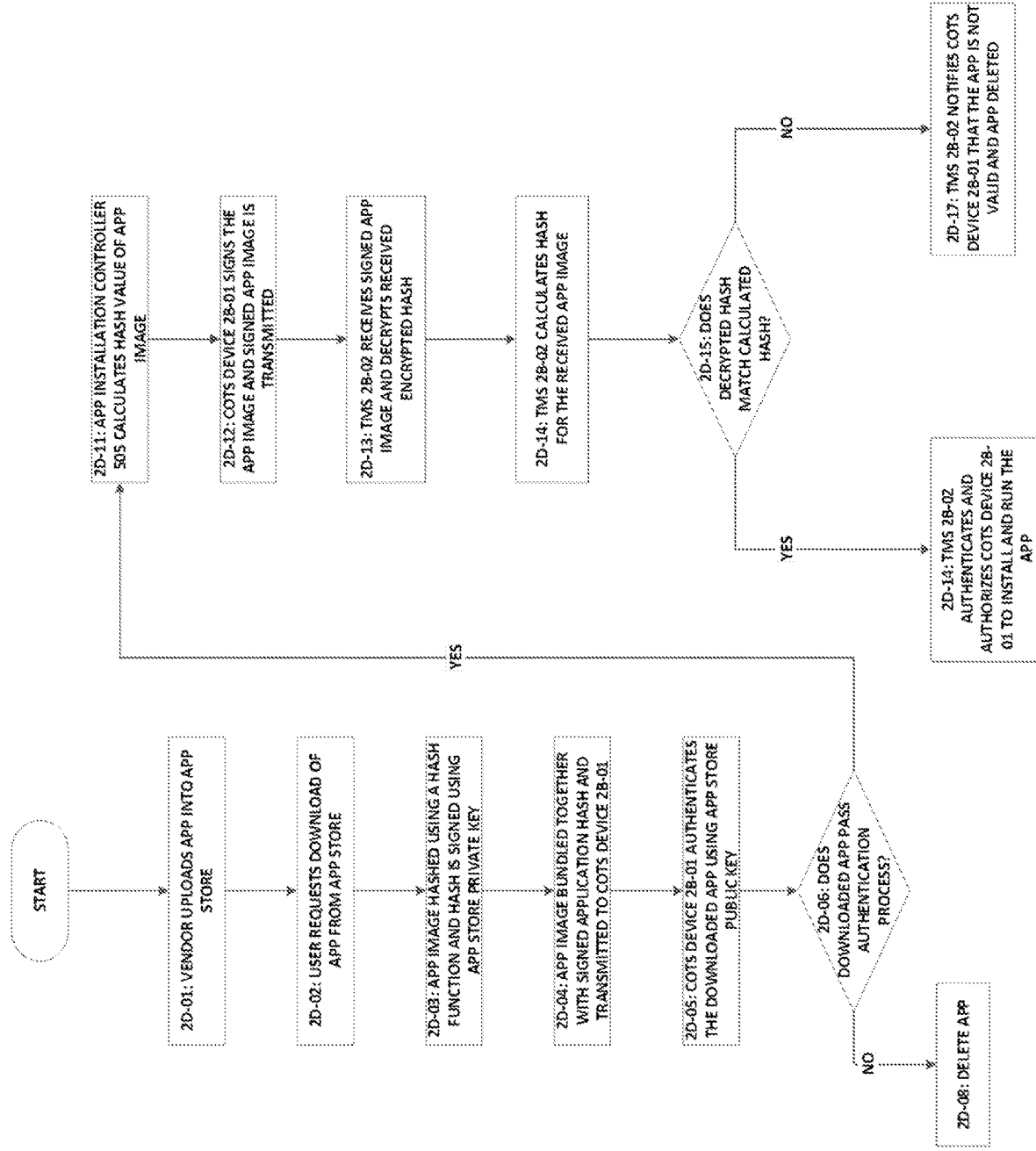
FIG. 2D illustrates an example of a process for vendor distribution of applications in accordance with various embodiments of this disclosure.

An example of a process for vendor distribution of apps including the TMS 2B-02 providing authentication for COTS device 2B-01 before installation and running of the app is illustrated in FIG. 2D.

In step 2D-01 the payment app 2C-04 is uploaded into the app store 2B-03. In step 2D-02 the user requests download of the app via COTS device 2B-01 from the app store 2B-03. In step 2D-03 the app image is hashed using a hash function on the app store 2B-03 to create a hash value. The resulting hash value is then signed with the app store private key. In step 2D-04 the app image is bundled with the signed application hash and transmitted to the COTS device 2B-01. In step 2D-05, the COTS device 2B-01 authenticates the downloaded app 2C-04, to determine whether it is from the app store 2B-03. The encrypted application hash is decrypted using the app store public key, and the downloaded app image is hashed on the COTS device 2B-01 using the same hash function which is on the app store 2B-03. The decrypted hash and the hash corresponding to the downloaded app image are compared to verify that the app image has authenticity, that is, the app image is real, and integrity, that is, the app image is good.

In step 2D-06 the authentication process is carried out. If the downloaded app does not pass the authentication process in step 2D-06, then in step 2D-08, the app 2C-04 is deleted from COTS device 2B-01.

In step 2D-11 of FIG. 2D, the app installation controller 2C-08 on COTS device 2B-01 calculates the hash value of the app image. This is performed using, for example, a hash function stored in storage 2C-03 of COTS device 2B-01.

In step 2D-12, the COTS device 2B-01 then signs the app image prior to transmission to the TMS 2B-02. This step comprises encrypting the resultant hash by a unique-per-device key and submitting the signature together with the app image to TMS 2B-02. In some embodiments, a symmetric key arrangement is used, that is, where TMS 2B-02 uses the same key as COTS device 2B-01 for decryption. In some embodiments, the signing then utilizes a symmetric key or some means based on a shared secret for TMS 2B-02 to derive such a symmetric key. An example is where TMS 2B-02 derives a symmetric key from a base-key and a unique number from COTS device 2B-01.

In some embodiments, an asymmetric key arrangement is used, that is, where TMS 2B-02 uses a different key to COTS device 2B-01 for decryption. An example would be where COTS device 2B-01 has a private key and sends the signature with a certification of its public key, so the TMS 2B-02 can verify and extract the terminal public key and using it for verifying the signature.

Steps 2D-13 to 2D-17 concern the authorization and authentication steps performed by TMS 2B-02. In step 2D-13, TMS 2B-02 receives the signed app image, and decrypts the received encrypted hash. In step 2D-14, TMS 2B-02 calculates a hash for the received app image using a stored hash function. In step 2D-15, TMS 2B-02 compares the two hash values. If the two hash values match each other, then in step 2D-16 TMS 2B-02 authenticates the app and authorizes the COTS device 2B-01 to install and run the app.

If the two hash values do not match each other, then in step 2D-17, TMS 2B-02 instructs COTS device 2B-01 that the app is not valid.

While the above describes a situation where the key is unique per device, there are other possibilities. For example, the keys can be unique per account, unique per session or unique per download. This offers more security compared to the prior art where the keys are limited to being unique per app image.

Since the signature for vendor app authentication no longer needs to be bundled with the app download package, the app is transparent to the standard app store. This is because the process of downloading the app is then similar to the process of downloading other non-payment apps. This makes it easier to use an app store for the purposes of distribution and managing of payment apps for terminals.

Figure 2E:
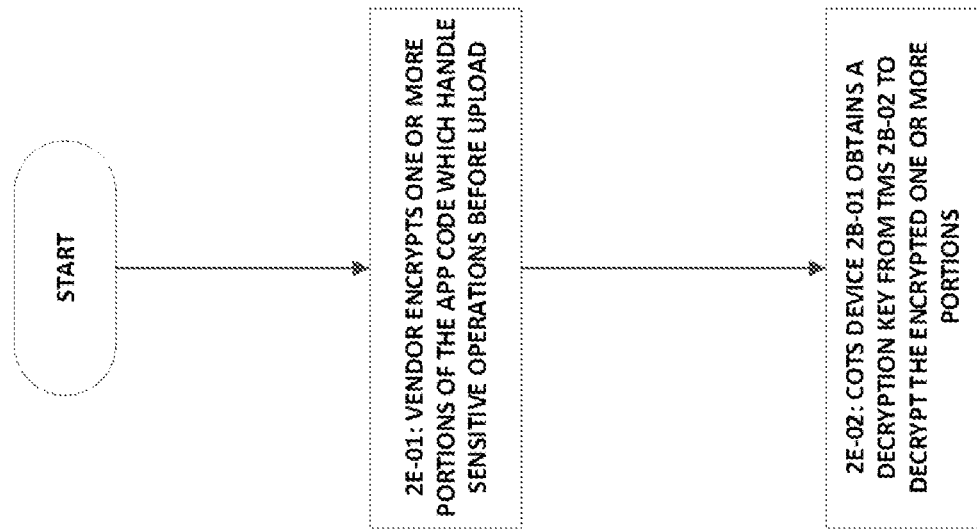
FIG. 2E illustrates an example of a security measure to prevent a sensitive portion of an application from running on one or more unauthorized devices in accordance with various embodiments of this disclosure.

As the apps for the COTS device 2B-01 are intended to be distributed in normal smart device platform app stores, such as the Google® Play store, devices other than those intended for payment may download and run the apps. This is not desirable. As explained above, one security measure is the requirement for a device to communicate with TMS 2B-02 over an encrypted channel. FIG. 2E shows an example of a further security measure to prevent the sensitive part of the app from running on unauthorized devices. In FIG. 2E:

The vendor 2B-04 encrypts the one or more portions of the app code which handle sensitive operations prior to uploading the app to the app store, as shown in step 2E-01, and Once the app is authenticated and authorized by the TMS 2B-02 for installation and running on COTS device 2B-01 following the process of FIG. 2D, the COTS device 2B-01 obtains a decryption key from the TMS 2B-02 to decrypt the encrypted one or more portions of the app image in step 2E-02.

Steps 2E-01 and 2E-02 work to prevent the protected code segment from being exposed outside a trusted execution environment, and the protected code segment prevents the app from performing critical/sensitive operations in devices or platforms other than intended devices with intended Electronic Funds Transfer Point of Sale (EFTPOS) platforms.

In some embodiments, app class sandboxes are employed to protect system resources and applications from being accessed by unauthorized apps. In some embodiments, the apps are divided into 3 classes, each having a corresponding app class sandbox, so as to achieve segregation of applications based on level of authorization and type of application. In some embodiments, these app class sandboxes are employed in addition to, for example, existing Linux/Android sandboxes.

An example of this segregation into different classes followed by utilization of app level sandboxes is shown in FIG. 2F. FIG. 2F shows the properties of each class in table 2F-00. Row 2F-01 of FIG. 2F corresponds to class A, row 2F-02 of FIG. 2F corresponds to class B, and row 2F-03 corresponds to class C. Column 2F-04 describes the types of app covered in each class, column 2F-05 describes the security objective of each class, and column 2F-06 describes the control means. For the remainder of this description each cell of the table 2F-00 is denoted by (row, column). For example, the cell which indicates the type of app covered in class A is in the cell within row 2F-01 and column 2F-04, and will be denoted as (2F-01, 2F-04).

Class A covers authorized payment apps, as shown in cell (2F-01, 2F-04). Class B covers authorized non-payment apps as shown in cell (2F-02, 2F-04). Class C covers unauthorized apps as shown in cell (2F-03, 2F-04).

The security objectives for each class are different. For class A apps: As shown in cell (2F-01, 2F-05), since these are authorized payment apps the OS does not restrict the access of these apps to sensitive data and functions. These apps are then placed in a relatively loose app class sandbox, with restrictions similar to, for example, the application sandbox in Security-Enhanced Linux (SE Linux), as shown in cell (2F-01, 2F-06).

For class B apps, as shown in cell (2F-02, 2F-05), the OS restricts the access of these apps to sensitive data and functions, such as the functions for reading finance card data, and certain related functions for cryptographic operations. Therefore, these apps will not be able to impact such sensitive assets. It significantly reduces the effort of app approval processes. The app class sandbox for class B apps therefore has restrictions on access to sensitive data and functions in addition to the restrictions of the app class sandbox for class A apps, as shown in cell (2F-02, 2F-06).

For class C apps, as shown in cell (2F-03, 2F-05), as the apps are not authorized by the vendor, in addition to the security objective for class B apps of restricting access to sensitive functions and data, the OS prevents these apps from requesting data from consumers and merchants, which may lead to security issues. Specifically, for EFTPOS, the risk with an unknown app is that the app can ask user to enter authentication information such as Personal-Identification-Number (PIN) or card account number. In some embodiments, a combination of one or more techniques is used to warn the user not to enter such information when running a class C app. These warning techniques operate independently of the app and have the following effect: If there is an unauthorized app displaying misleading messages requesting sensitive information such as payment data to be entered into the app, then since the app cannot control the operation of these techniques, the user will then be warned not to enter sensitive information into the app. These methods include, for example:

Screen watermarking,
Screen flying stamp,
Screen status bar,
Screen border,
Screen overlay,
Dedicated light indicator,
Warning sound, and
Warning vibration.

The app class sandbox for class C apps therefore has extra restrictions when compared to the app class sandbox restrictions for class B apps.

It would be known to one of skill in the art that the approach described above and in FIG. 2F is generalizable to more than 3 classes.

In some embodiments, the COTS device determines the class of the app being installed. The determination is based on, for example:

attribute field from the app,
the signing key of the app, or
the information from TMS 2B-02 when the app is being authenticated.

An example of a method for vendor upload of apps incorporating classification of apps so as to determine the relevant app class sandbox is illustrated in FIG. 2G. Steps 2G-01 to 2G-06 and 2G-08 are identical to steps 2D-01 to 2D-06 and 2D-08 of FIG. 2D. If in step 2G-06 the downloaded app passes the authentication process, then in step 2G-07 a determination is made as to whether the app is an EFTPOS vendor app. If no, then in step 2G-21 the app is installed as a class C app. If yes, then step 2G-11 is executed. Steps 2G-11 to 2G-17 are identical to steps 2D-11 to 2D-17 of FIG. 2D. In step 2G-18 a determination is made as to whether the app is a payment app. If it is a payment app in step 2G-19 the app is installed as a class A app. If not, then in step 2G-20 the app is installed as a class B app.

Typically, apps may require patches for bugs and vulnerabilities, upgrades and introductions of new features. For EFTPOS vendors, traditionally these updates were distributed by terminal vendors, acquirers, or other third parties certified by electronic payment industrial standards. However, as the size of the new updates and patches are significantly larger in size than ordinary EFTPOS firmware and software, it implies a heavy loading to the traditional terminal-management-system or other traditional distribution channels, which is very undesirable.

In some embodiments, the process outlined above in FIGS. 2D and 2G can be generalized to these other processes. This makes maintenance and updating of such apps easier as well, as most app stores are better equipped for maintenance and updating of apps. Furthermore, this makes it easier to improve Quality of Service (QoS), as app stores have established procedures to improve QoS. Then, the authenticity, authority, integrity and sensitive code privacy can be assured by such methods.

Figure 3:
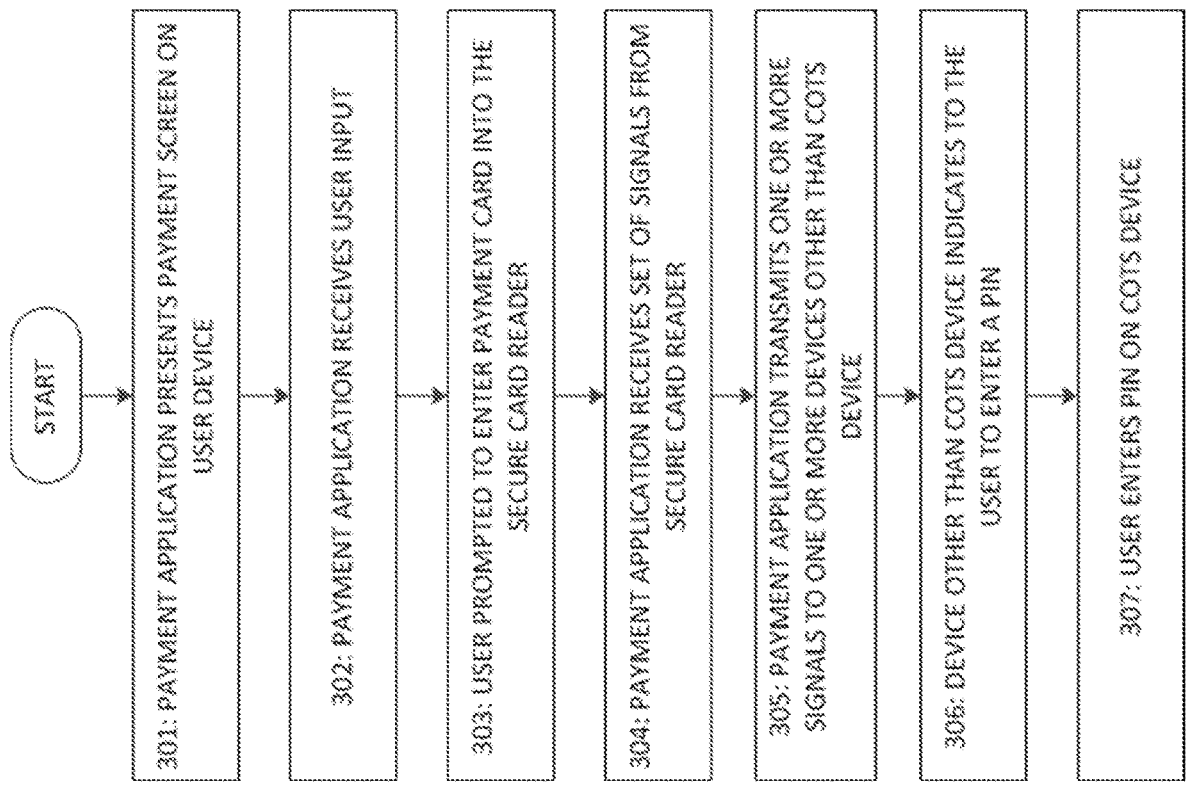
FIG. 3 illustrates an example of a process for prompt transmission by a payment application in accordance with various embodiments of this disclosure.

As part of the payment process, the payment application 102-4 transmits one or more prompts to one or more user devices 110 to indicate to the user to enter a card and a PIN. FIG. 3 demonstrates a process for prompt transmission by the payment application 102-4.

In step 301, the payment application presents a payment screen on display 102-3 of COTS device 102 to user 101. An example of a payment screen 400 is presented in FIG. 4. Screen 400 displays items for purchase 401, payment totals 402 and "pay" button 403.

In step 302, user 101 activates pay button 403. The payment application receives the input, and prompts the user to enter payment card 104 into the secure card reader.

In step 303, the user is prompted to enter the payment card into the secure card reader 103. The secure card reader 103 is able to read information stored on the payment card and retrieve, for example, an email address associated with the user.

In step 304, the payment application 102-4 running on COTS device 102 receives a set of signals from secure card reader 103 over connection 107 indicating that the payment card 104 has been entered into secure card reader 103, and requesting a PIN number for verification. In some embodiments, the set of signals also comprises one or more addresses necessary to transmit one or more prompts to the user.

In step 305, the payment application 102-4 transmits one or more signals to one or more devices other than COTS device 102, wherein the one or more signals comprise one or more prompts to indicate to the user to enter a PIN. In some embodiments, this comprises a prompt transmitted to the secure card reader. In some embodiments, this comprises a prompt transmitted to one or one or more devices 110 over a messaging medium such as Short Message Service (SMS), email, instant messaging.

Figure 5:
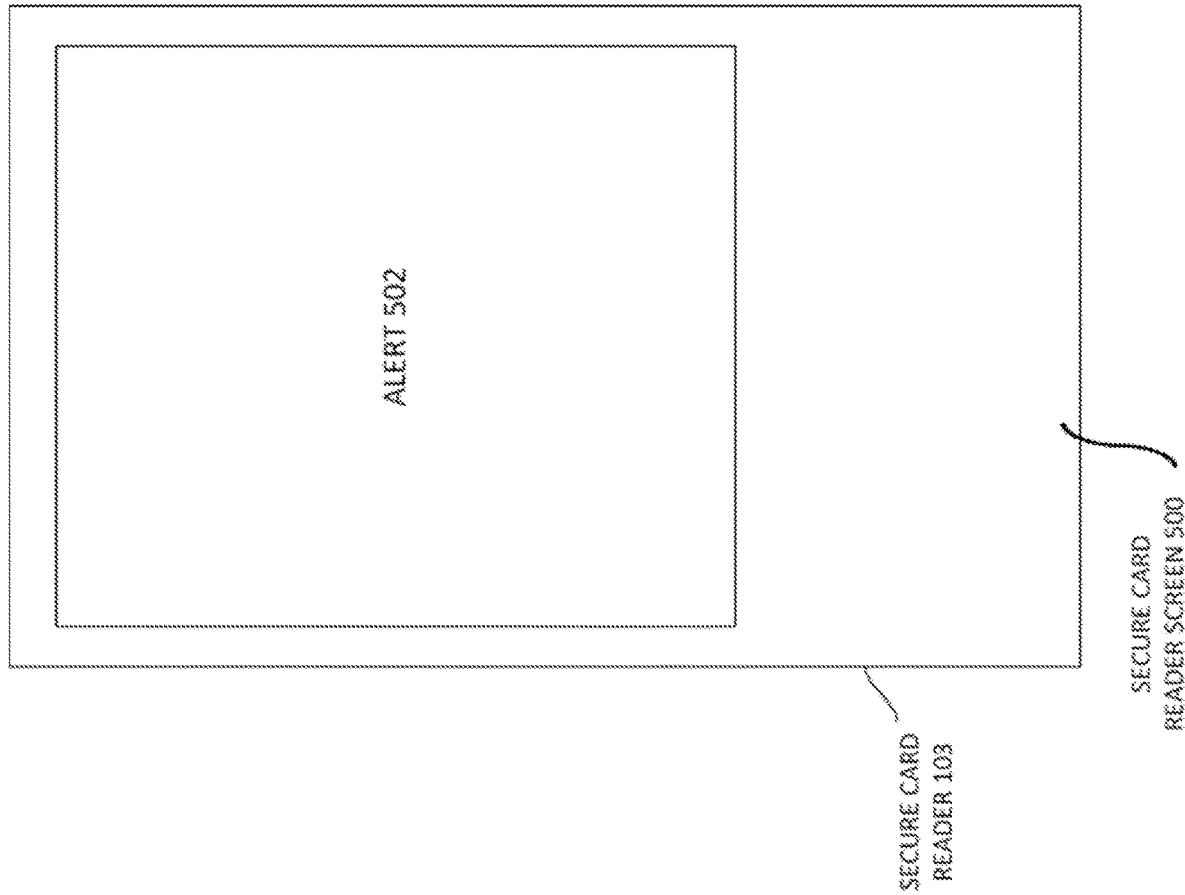
FIG. 5 illustrates an example of a display of an alert in accordance with various embodiments of this disclosure.

In step 306, the device other than COTS device 102 receives the transmitted prompt and based on the transmitted prompt, indicates to the user to enter a PIN. In some embodiments, this comprises displaying an alert on a screen of the device other than the COTS device 102. An example is shown in FIG. 5. Alert 502 is displayed on, for example, screen 500 of secure card reader 103.

As would be known to one of skill in the art, other forms of indication can also be used, for example:
- Visual indication, such as a flashing light/LED on the device other than the COTS device.
- Audio indication, such as a beep sound from buzzer on the device other than the COTS device.
- Motion indication, including vibration or movement on the device other than the COTS device.

Figure 6:
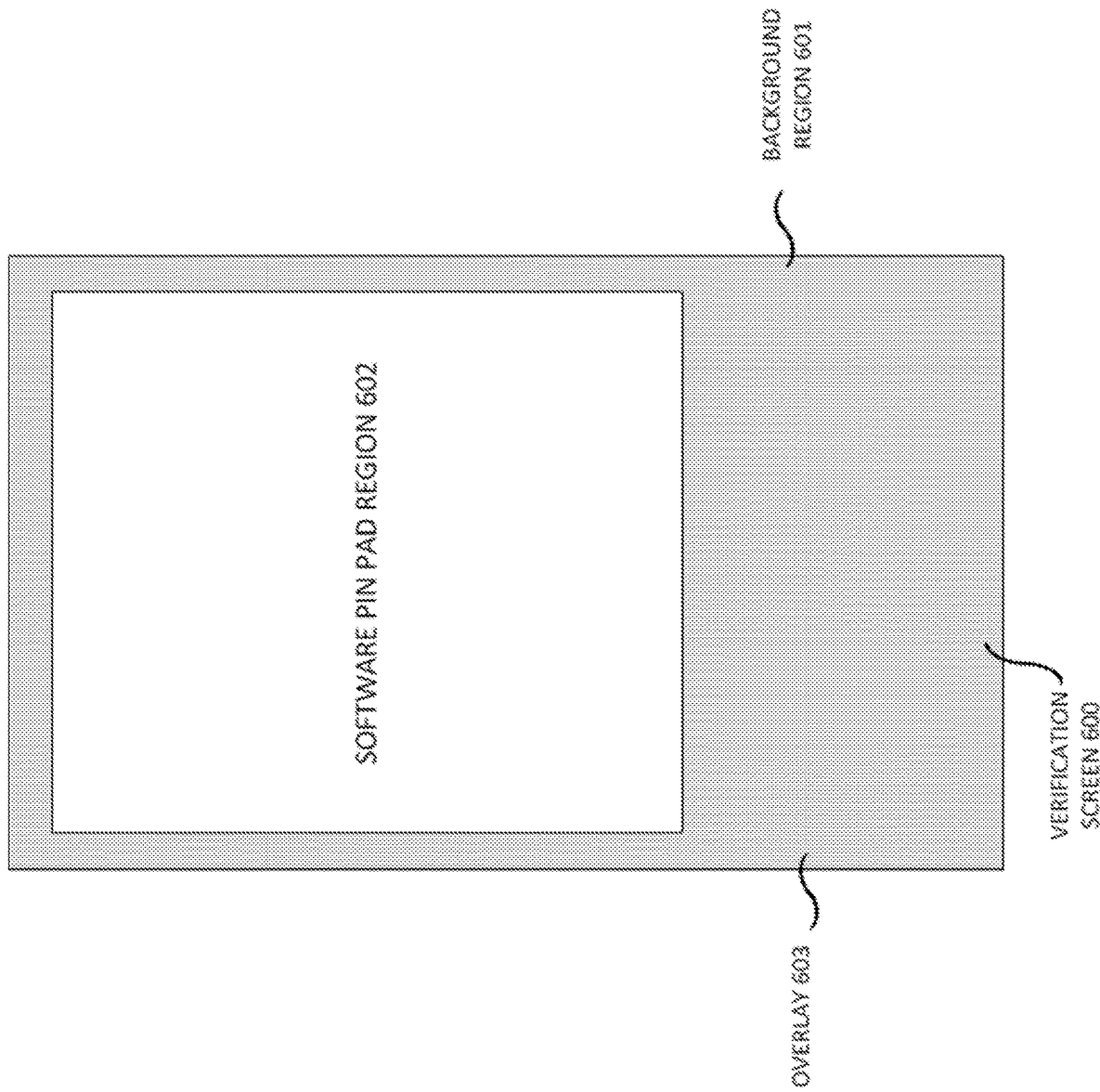
FIG. 6 illustrates an example of a verification screen in accordance with various embodiments of this disclosure.

In step 307, based on the indication, the user enters a PIN on a PIN pad displayed by payment application 102-4 on a verification screen presented on the display of the COTS device 102. An example of the verification screen is presented in FIG. 6. In FIG. 6, verification screen 500 comprises background 601, and a software PIN pad region 602 where the PIN pad is displayed.

In some embodiments, the display parameters of the PIN pad are randomized. Systems and methods for randomization were described in U.S. patent application Ser. No. 16/166,353, to Tsai et al, filed Oct. 22, 2018.

Figure 7A:
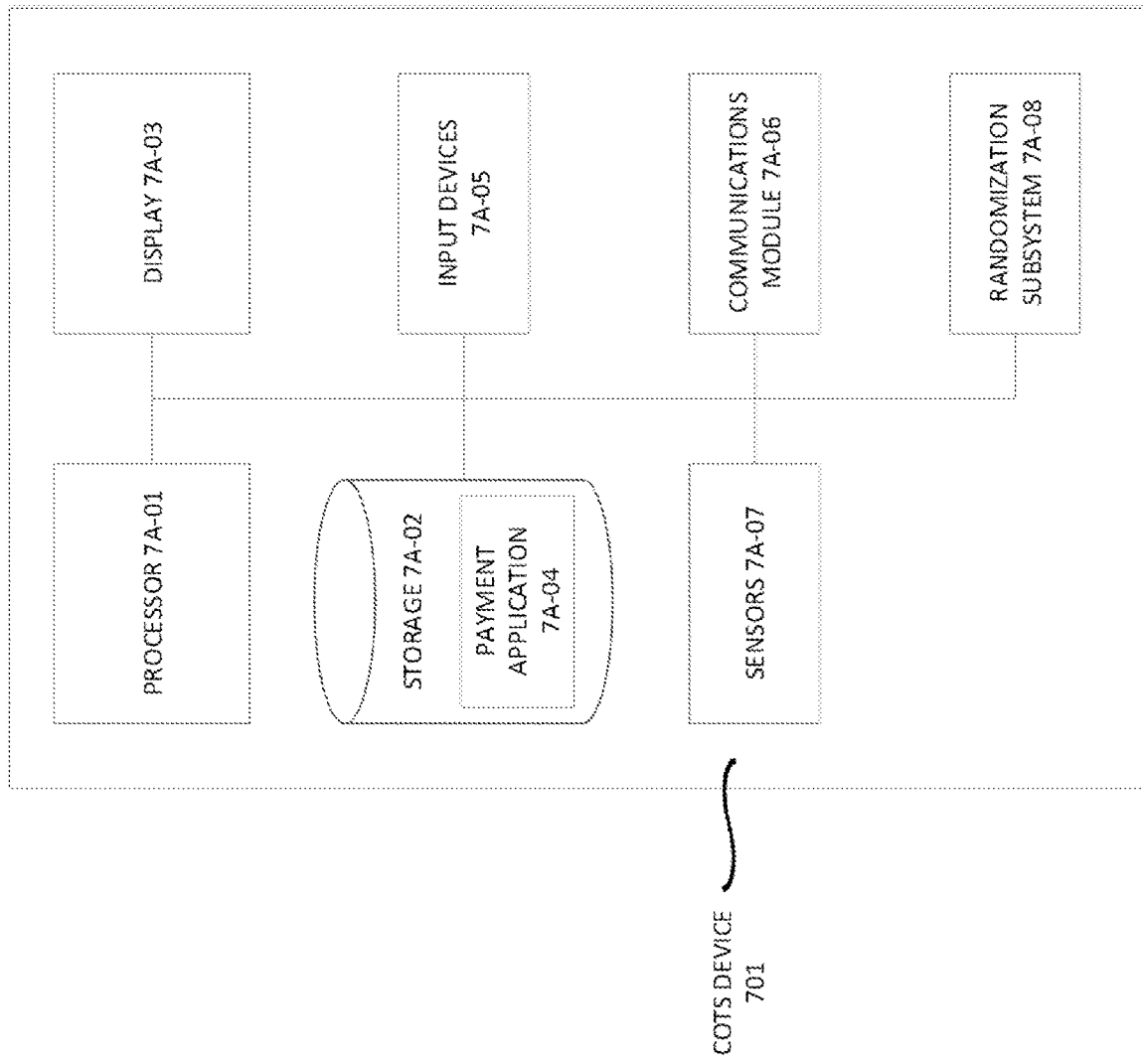
FIG. 7A illustrates an example of a COTS device which incorporates a randomization subsystem in accordance with various embodiments of this disclosure.

Examples are shown below in FIGS. 7A-7N. FIG. 7A illustrates an example of a COTS device. In FIG. 7A, components 7A-01 to 7A-07 of COTS device 701 are similar to components 102-1 to 102-7 of COTS device 102. COTS device 701 also incorporates the functionalities of an additional randomization subsystem similar to randomization subsystem 7A-08 of FIG. 1 of U.S. patent application Ser. No. 16/166,353. In some embodiments, as shown in FIG. 7A, COTS device 701 comprises a separate randomization subsystem 7A-08 component. While in FIG. 7A additional randomization subsystem 7A-08 is shown as a separate component, one of skill in the art would know there are other ways to incorporate additional randomization subsystem 7A-08 into COTS device 701. For example, in some embodiments, payment application 7A-04 comprises an additional randomization subsystem. In some embodiments, processor 102-1 performs the functionalities of additional randomization subsystem 7A-08.

Randomization subsystem 7A-08 performs the function of randomly selecting values for one or more variables related to at least one of said one or more display parameters. Randomization subsystem 7A-08 can be implemented in a variety of ways. In some embodiments, randomization subsystem 7A-08 is implemented in hardware. In some embodiments, randomization subsystem 7A-08 is implemented in software. In some embodiments, randomization subsystem 7A-08 is implemented using a combination of hardware and software. Randomization subsystem 7A-08 performs the random selections detailed below using one or more probability distributions. Examples of probability distributions which are used are, for example, the uniform distribution and the Gaussian distribution.

Figure 7B:
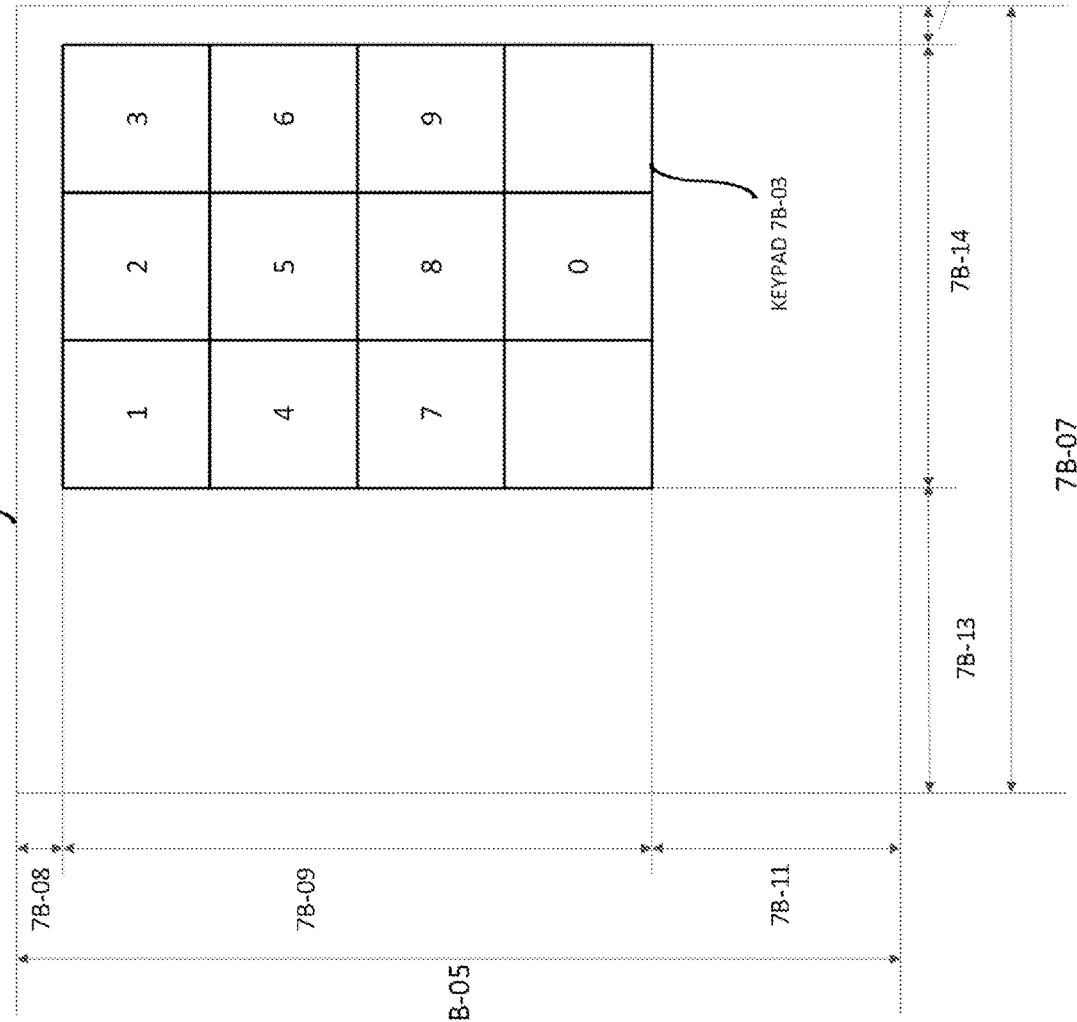
FIG. 7B illustrates an example of a keypad displayed on a touchscreen in accordance with various embodiments of this disclosure.

A detailed example of a keypad on a touchscreen is shown in FIG. 7B. As explained previously, in some embodiments, display 7A-03 of COTS device 701 is a touchscreen. In the following explanations, this touchscreen will be referred to as touchscreen 7A-09, and it is also part of input devices 7A-05. In FIG. 7B, keypad 7B-03 is displayed within touchscreen 7A-09. Touchscreen 7A-09 has a width 7B-07 in the horizontal or x-direction; and a height 7B-05 in the vertical or y-direction. Keypad 7B-03 has a width 7B-14 in the x-direction and a height 7B-09 in the y-direction. There is an x-direction gap 7B-12 between the vertical edge of the touchscreen and the vertical edge of the keypad, such that keypad width 7B-14 is less than touchscreen width 7B-07. Similarly, there is a y-direction gap 7B-08 between the horizontal edge of the touchscreen and the horizontal edge of the keypad, such that keypad height 7B-09 is less than touchscreen height 7B-05.

In some embodiments, randomization subsystem 7A-08 randomly selects only the location of the keypad relative to a corner of the touchscreen. Examples are shown below. In these embodiments, keypad width 7B-14 and keypad height 7B-09 are fixed.

The location of the bottom left corner of the keypad relative to the bottom left corner of touchscreen 7A-09 is given by the variables of (x,y) co-ordinates (7B-13, 7B-11). The range of possible values of the location x-co-ordinate 7B-13 is calculated based on the touchscreen width 7B-07 and the keypad width 7B-14. Similarly, the range of possible values of the location y-co-ordinate 7B-11 is calculated based on the touchscreen height 7B-05 and the keypad height 7B-09.

In some embodiments, these calculations take into account the need for gaps between the vertical edges of the touchscreen 7A-09 and keypad 7B-03; and between the horizontal edges of the touchscreen 7A-09 and keypad 7B-03. Examples are demonstrated below:

The maximum value of the location x-co-ordinate 7B-13 is calculated based on the touchscreen width 7B-07 and the keypad width 7B-14. In some embodiments, this takes into account any x-direction gaps. For example, in some embodiments, the maximum value of the location x-co-ordinate 7B-13 given by the difference between touchscreen width 7B-07 and keypad width 7B-14 and an x-direction gap 7B-12 between the right edge of the touchscreen 7A-09 and keypad 7B-03. That is:

Maximum value of location $x$-co-ordinate $7B$-$13$ = (touchscreen width $7B$-$07$) − (keypad width $7B$-$14$ + $x$-direction gap $7B$-$12$)

While only one x-direction gap between the right edges of the touchscreen 7A-09 and keypad 7B-03 is shown in FIG. 7B, one of skill in the art would know that this is one example. In some embodiments, there is a second x-direction gap between the left edges of the touchscreen 7A-09 and keypad 7B-03.

Similarly, the maximum value of the location y-co-ordinate 7B-11 is calculated based on the touchscreen height 7B-05 and the keypad height 7B-09. In some embodiments, this takes into account any y-direction gaps. For example, in some embodiments, the maximum value of the location y-co-ordinate 7B-11 given by the difference between touchscreen height 7B-05 and keypad height 7B-09 and a y-direction gap 7B-08 between the upper edges of the touchscreen 7A-09 and keypad 7B-03. That is:

Maximum value of location $y$-co-ordinate $7B$-$11$ = (touchscreen height $7B$-$05$) − (keypad height $7B$-$09$ + $y$-direction gap $7B$-$08$)

While only one y-direction gap between the upper edges of the touchscreen 7A-09 and keypad 7B-03 is shown in FIG. 7B, one of skill in the art would know that this is one example. In some embodiments, there is a second y-direction gap between the bottom edges of the touchscreen 7A-09 and keypad 7B-03.

Then, in the example corresponding to a single x-direction gap, the location x-co-ordinate 7B-13 is selected randomly from the range [0, (touchscreen width 7B-07)−(keypad width 7B-14+x-direction gap 7B-12)]. Similarly, in the example corresponding to a single y-direction gap, location y-co-ordinate 7B-11 is selected randomly from the range [0, (touchscreen height 7B-05)−(keypad height 7B-09+y-direction gap 7B-08)].

In the example corresponding to two x-direction gaps, the location x-co-ordinate 7B-13 is selected randomly from the range [x-direction gap 7B-12, (touchscreen width 7B-07)–(keypad width 7B-14+x-direction gap 7B-12)]. Similarly, in the example corresponding to two y-direction gaps, location y-co-ordinate 7B-11 is selected randomly from the range [y-direction gap 7B-08, (touchscreen height 7B-05)–(keypad height 7B-09+y-direction gap 7B-08)].

These variables are randomly selected by randomization subsystem 7A-08 based on one or more probability distributions such as the uniform distribution or the Gaussian distribution as explained above.

In this way, the location of the keypad (7B-13, 7B-11) is randomly distributed. Therefore, the locations of each of the buttons are not fixed in time as well. This makes it difficult for an attacker to guess the coordinates of user interactions with keypad 7B-03 on touchscreen 7A-09.

In some embodiments, randomization subsystem 7A-08 only randomly selects the size of the keypad, that is, only the variables of keypad width 7B-14 and keypad height 7B-09 are randomly selected. In some embodiments, the ranges of available keypad widths and keypad heights take into account any requirements for gaps between the keypad and touchscreen edges. Examples are demonstrated below for a case where there are two x-direction gaps and two y-direction gaps.

With reference to FIG. 7B, in some embodiments, the keypad width 7B-14 is randomly selected from the range [Xkeymin, (touchscreen width 7B-07)–2×(x-direction gap 7B-12)], where Xkeymin is the minimum length of the keyboard in the x-direction. The keypad height 7B-09 is randomly selected from the range [Ykeymin, touchscreen height 7B-05–2×(y-direction gap 7B-08)], where Ykeymin is the minimum height of the keyboard in the y-direction. Then the location co-ordinates (7B-13,7B-11) are calculated taking into account the randomly selected touchscreen width and height.

Location x-coordinate 7B-13=touchscreen width 7B-07–keypad width 7B-14

Location y-coordinate 7B-11=touchscreen height 7B-05–keypad height 7B-09

In some embodiments, randomization subsystem 7A-08 only randomly selects the size of the buttons in the keypad. That is, keypad width 7B-14, keypad height 7B-09, the location x-co-ordinate 7B-13 and y-co-ordinate 7B-11 are all fixed. At least one of the heights and widths of the buttons within the keypad are randomly selected.

Figure 7C:
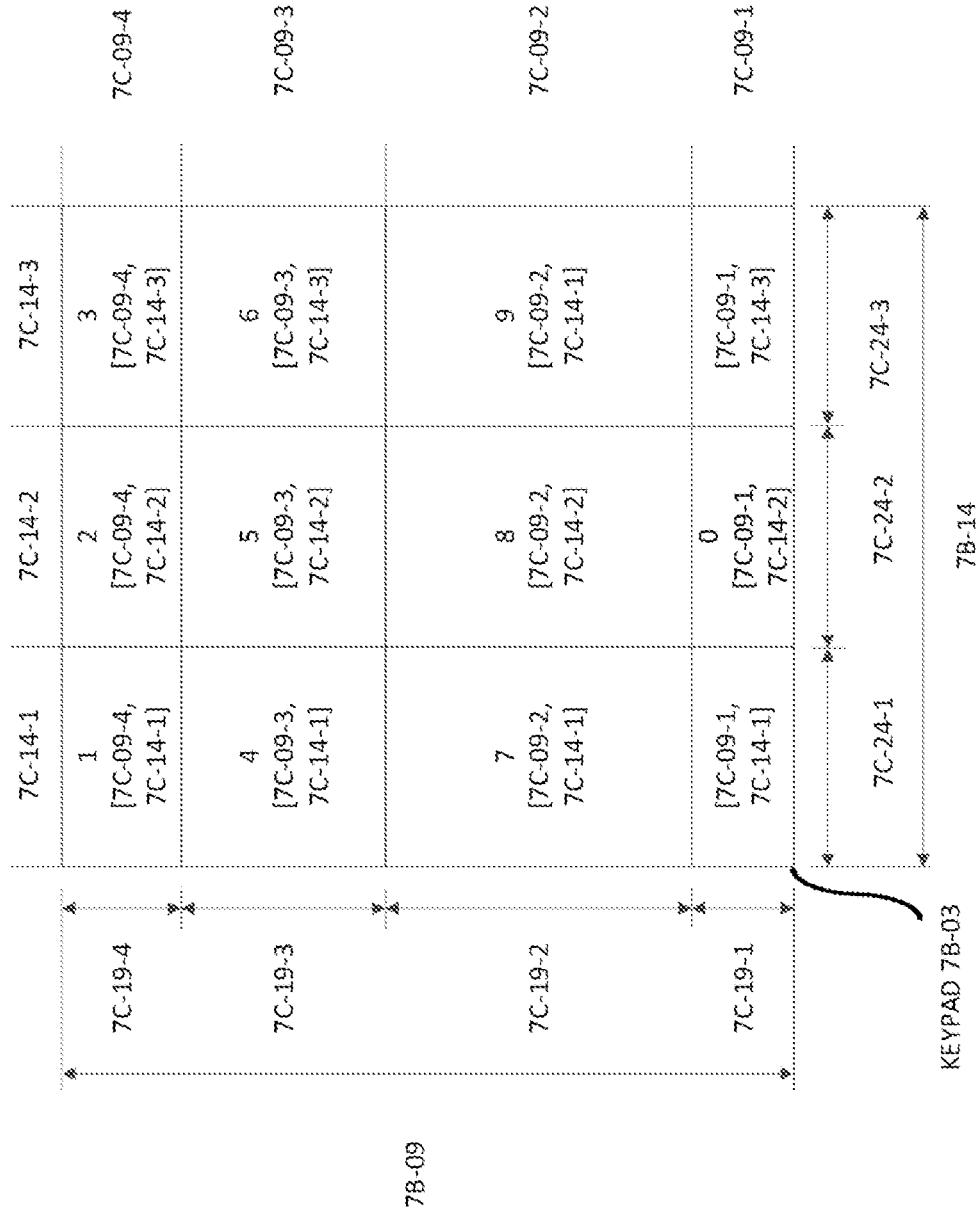
FIG. 7C illustrates a detailed example of a keypad in accordance with various embodiments of this disclosure.

This is demonstrated further below. FIG. 7C illustrates a further detailed description of keypad 7B-03. Keypad 7B-03 comprises columns 7C-14-1, 7C-14-2 and 7C-14-3; and rows 309-1, 309-2, 309-3 and 309-4. In this example, each button within keypad 7B-03 is referenced by [row, column] notation. For example, the button containing the number "1" is button [309-4, 7C-14-1].

The width of columns 7C-14-1, 7C-14-2 and 7C-14-3 are given by 7C-24-1, 7C-24-2 and 7C-24-3 respectively. The height of rows 7C-09-1, 7C-09-2, 7C-09-3 and 7C-09-4 are given by 7C-19-1, 7C-19-2, 7C-19-3 and 7C-19-4 respectively. Then the width of button [7C-09-4, 7C-14-1] is 7C-24-1 and the height of button [7C-09-4, 7C-14-1] is given by 7C-19-4.

Examples to randomly select at least one of button widths and button heights of keypad 7B-03 are then presented below.

Figure 7D:
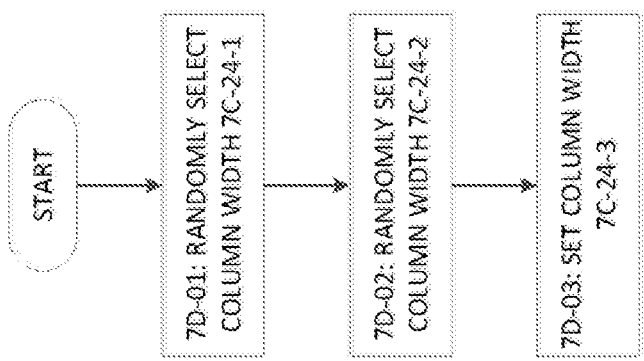
FIG. 7D illustrates an example of a process to randomly select the width of a button in accordance with various embodiments of this disclosure.

In some embodiments, the row heights 7C-19-1, 7C-19-2, 7C-19-3 and 7C-19-4 are fixed, and the width of each column is randomly selected. With reference to FIG. 7D, in step 7D-01 randomization subsystem 7A-08 randomly selects column width 7C-24-1 from the range [XBmin, (keypad width 7B-14)–2×XBmin], where XBmin is the minimum width of the button in the horizontal (x) direction.

In step 7D-02, column width 7C-24-2 is randomly selected by randomization subsystem 7A-08 from the range [XBmin, (keypad width 7B-14)–(7C-24-1+XBmin)].

In step 7D-03, column width 7C-24-3 is then set to [keypad width 7B-14–(column width 7C-24-1+column width 7C-24-2)].

Figure 7E:
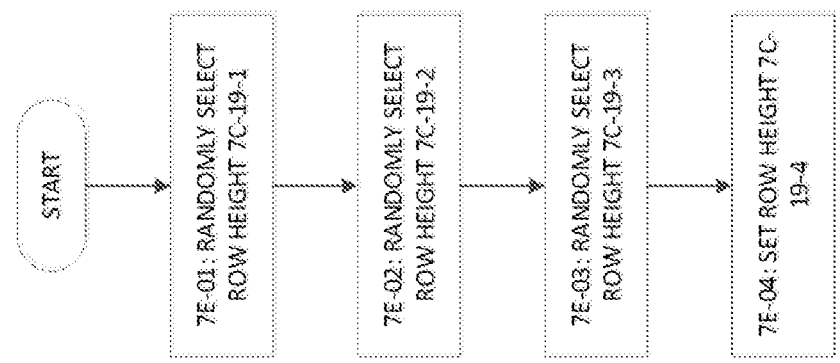
FIG. 7E illustrates an example of a process to randomly select the height of a button in accordance with various embodiments of this disclosure.

In some embodiments, the column widths are fixed, and the heights of each row are randomly selected. With reference to FIG. 7E, in step 7E-01, row height 7C-19-1 is randomly selected by randomization subsystem 7A-08 from the range [YBmin, keypad height 7B-09–3×YBmin], where YBmin is the minimum height of the button in the vertical (y) direction.

In step 7E-02, row height 7C-19-2 is randomly selected by randomization subsystem 7A-08 from the range [YBmin, keypad height 7B-09–(row height 7C-19-1+2×YBmin)].

In step 7E-03, row height 7C-19-3 is randomly selected by randomization subsystem 7A-08 from the range [YBmin, keypad height 7B-09–(row height 7C-19-1+row height 7C-19-2+YBmin)].

In step 7E-04, row height 7C-19-4 is then set to keypad height 7B-09–(row height 7C-19-1+row height 7C-19-2+row height 7C-19-3).

In some embodiments, both row heights and column widths are randomly selected. This is a combination of the steps in FIGS. 7D and 7E.

Figure 7F:
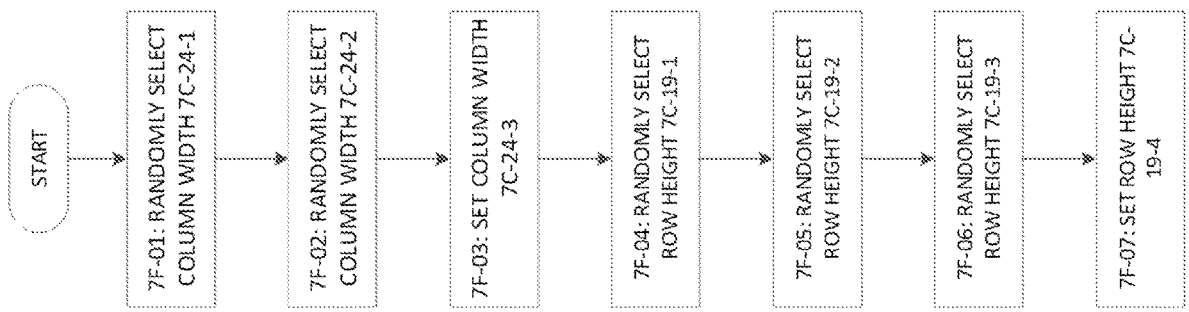
FIG. 7F illustrates an example of a process to select row heights and column widths in series in accordance with various embodiments of this disclosure.

In some embodiments, this is performed in series. FIG. 7F illustrates a detailed example for performance in series. With reference to FIG. 7F, steps 7F-01 to 7F-03 are identical to steps 7D-01 to 7D-03 of FIG. 7D. Steps 7F-04 to 7F-07 are identical to steps 7E-01 to 7E-04 of FIG. 7E.

Figure 7G:
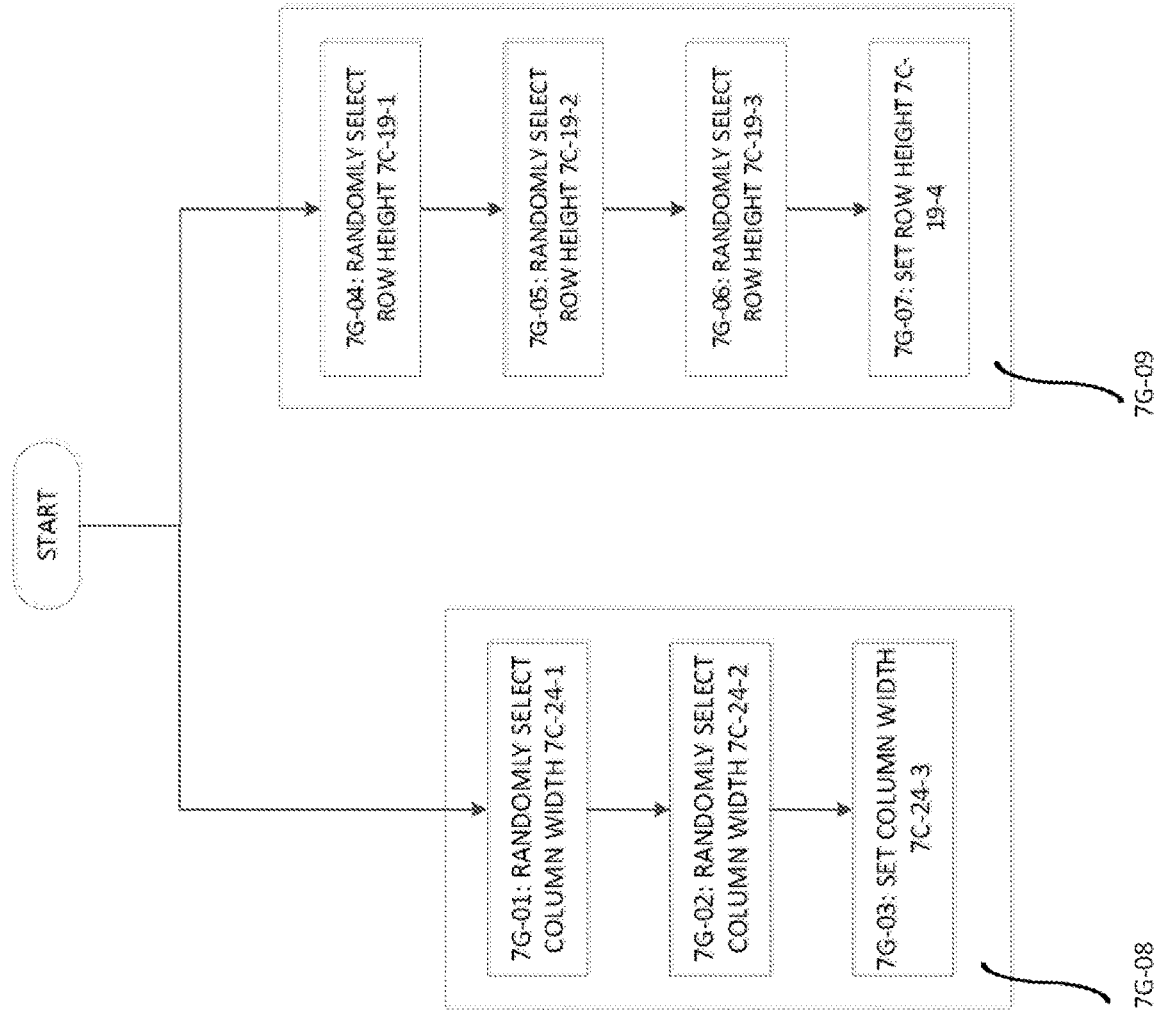
FIG. 7G illustrates an example of a process to select row heights and column widths in parallel in accordance with various embodiments of this disclosure.

In some embodiments, this is performed in parallel as shown in FIG. 7G. In FIG. 7G branch 7G-08 comprises steps 7G-01 to 7G-03, which are identical to steps 7F-01 to 7F-03 of FIG. 7F. Branch 7G-09 comprises the steps 7G-04 to 7G-07, which are identical to steps 7F-04 to 7F-07 of FIG. 7F. The steps of branches 7G-08 and 7G-09 are performed in parallel by randomization subsystem 7A-08 to improve processing speed.

In some embodiments, one or more positions of groups of buttons are randomly selected by randomization subsystem 7A-08. Examples of such groups are the rows and columns on the keypad. By random selecting the positions of groups of buttons, at least some of the positional relationships within the group are still maintained. For example, when the position of a row of buttons is changed, the horizontal relationships among the buttons within the row are still maintained. This is likely to reduce the difficulty faced by the user when compared to the case of complete randomization of button layout, where both horizontal and vertical relationships may be completely changed.

As would be appreciated by one of skill in the art, in a keypad such as that shown in FIG. 7B, there are 4!=24 possible row arrangements and 3!=6 possible column arrangements. In some embodiments, one of these row arrangements or column arrangement are randomly selected. By doing so, it is possible to increase the difficulty faced by an attacker in determining the coordinates of touchscreen interactions by a user.

Another possibility is "rolling" up the rows by rollup parameter RP, which is an integer greater than or equal to 1.

Figure 4:
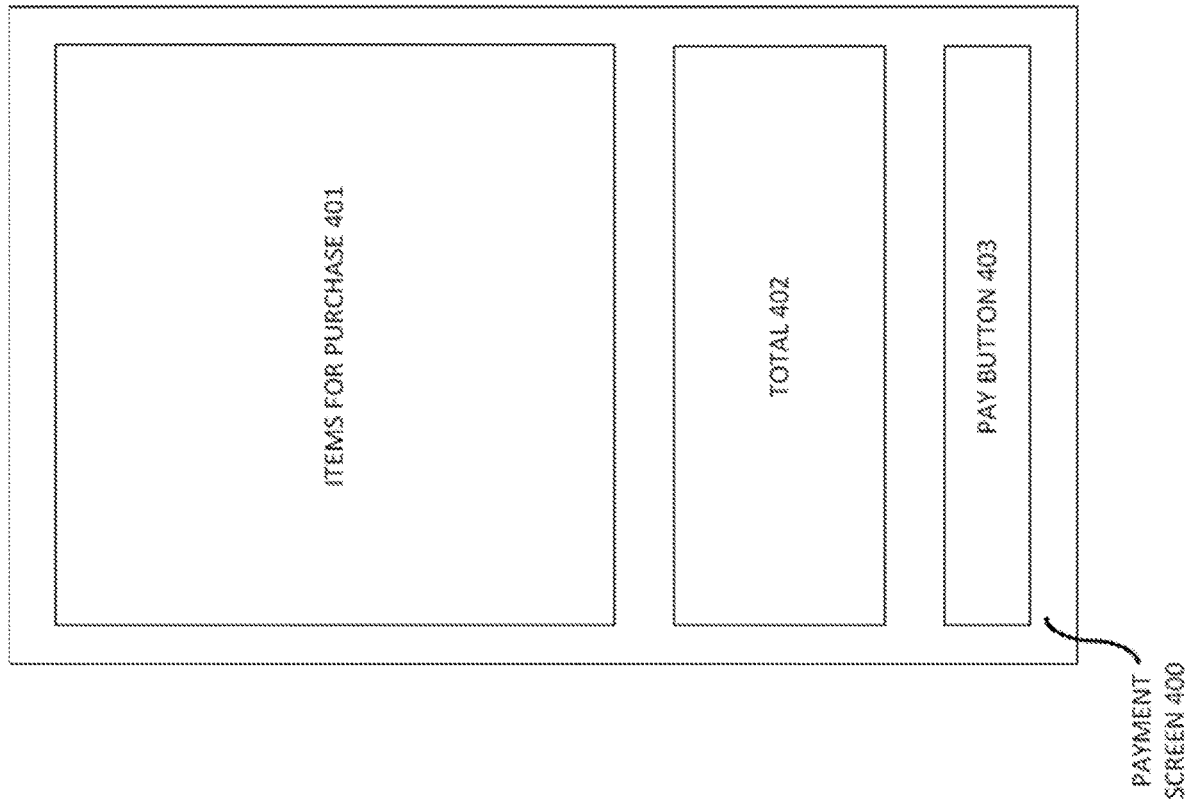
FIG. 4 illustrates an example of a payment screen in accordance with various embodiments of this disclosure.

This involves moving each row up RP times and "wrapping around" when it reaches the top. An example is demonstrated below:

FIG. 7H shows the starting position for the keypad. The notation for the row references in FIG. 7H are 7H-01-(row position). For example, the reference for row position 0 is denoted as 7H-01-0; the reference for row position 1 is denoted as 7H-01-1 and so on. The notation for the column references in FIG. 4 are 7H-11-(column position). For example, the reference for column position 0 is denoted as 7H-11-0, the reference for column position 1 is denoted as 7H-11-1 and so on.

Initially
row 7C-09-1 is in row position 0, referenced as 7H-01-0;
row 7C-09-2 is in row position 1, referenced as 7H-01-1;
row 7C-09-3 is in row position 2, referenced as 7H-01-2;
row 7C-09-4 is in row position 3, referenced as 7H-01-3;
column 7C-14-1 is in column position 0, referenced as 7H-11-0;
column 7C-14-2 is in column position 1, referenced as 7H-11-1; and
column 7C-14-3 is in column position 2, referenced as 7H-11-2.

Then RP is randomly selected from a range [1, 3]. The new row position is determined by New row position=(Starting row position+RP)(mod 4), where mod denotes the integer modulo operation.

FIG. 7I shows an example where RP=1. In FIG. 7I,

New row position of 7*C*-09-1=(0+1)(mod 4)=1, referenced by 7*H*-01-1;

New row position of 7*C*-09-2=(1+1)(mod 4)=2, referenced by 7*H*-01-2;

New row position of 7*C*-09-3=(2+1)(mod 4)=3, referenced by 7*H*-01-3; and

New row position of 7*C*-09-4=(3+1)(mod 4)=0, referenced by 7*H*-01-0.

A similar operation can be carried out for columns. This is denoted as "flipping" columns by flip parameter (FP) which is an integer greater than or equal to 1. Each column is moved rightwards FP times and "wrapped around" when it reaches the right edge.

FIG. 7H above shows the starting position for the keypad. FP is randomly selected from a range [1, 2]. The new column position is determined by:

New column position=(Starting column position+FP) (mod 3)

FIG. 7J shows an example where FP=1.

New column position of 7*C*-14-1=(0+1)(mod 3)=1, referenced by 7*H*-11-1;

New column position of 7*C*-14-2=(1+1)(mod 3)=2, referenced by 7*H*-11-2; and

New column position of 7*C*-14-3=(2+1)(mod 3)=0, referenced by 7*H*-11-0;

Another possibility is randomly "mirroring" the button layout. A left to right mirror image of the starting position keypad in FIG. 7H is given in FIG. 7K. As can be seen in FIG. 7K, column 7C-14-1 changes position to column position 7H-11-2 and column position 7C-14-3 changes position to column position 7H-11-0. Then randomization subsystem 7A-08 makes a random selection from either the starting position or the horizontal mirrored position.

In some embodiments, a vertical mirroring is used as shown in FIG. 7L. In the vertical mirror image, the row positions of 7C-09-1 and 7C-09-4 in the starting position are interchanged, as are the row positions of 7C-09-2 and 7C-09-3. Then randomization subsystem 7A-08 makes a random selection from either the starting position or the vertical mirrored position.

Figure 7M:
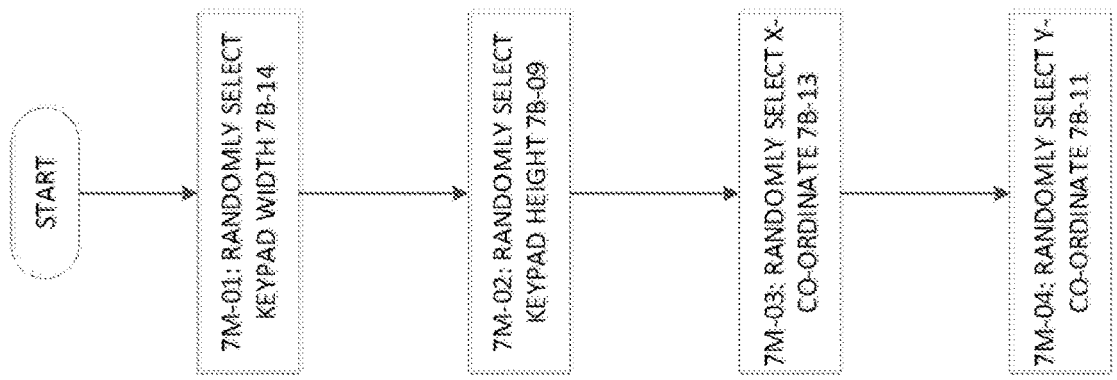
FIG. 7M illustrates an example of random selection of two or more display parameters in combination in accordance with various embodiments of this disclosure.
Figure 7N:
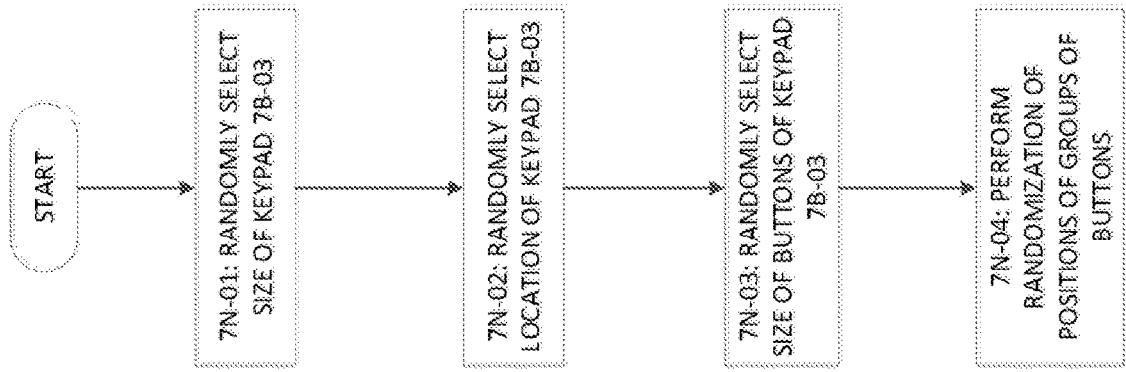
FIG. 7N illustrates an example of a sequence for a random selection of combinations of display parameters in accordance with various embodiments of this disclosure.

It is possible to randomly select two or more display parameters in combination. FIG. 7M illustrates one example of a random selection of a combination of location of the keypad relative to a corner; and size of the keypad. In step 7M-01, keypad width 7B-14 is selected randomly by randomization subsystem 7A-08 from the range [Xkeymin, (touchscreen width 7B-07-2×x-direction gap 7B-12)]. Xkeymin represents a minimum width for the keypad.

In step 7M-02, randomization subsystem 7A-08 randomly selects keypad height 7B-09 from the range [Ykeymin, (touchscreen height 7B-05-2×y-direction gap 7B-08)]. Ykeymin represents a minimum height for the keypad.

In step 7M-03, randomization subsystem 7A-08 randomly selects x-coordinate 7B-13 from the range [0, (touchscreen width 7B-07–keypad width 7B-14)].

In step 7M-04, randomization subsystem 7A-08 randomly selects y-coordinate 7B-11 from the range [0, (touchscreen height 7B-05–keypad height 7B-09)].

In some embodiments, sequences of random selections of combinations of display parameters are implemented. For example, a sequence for a combination of randomization of location of keypad, size of keypad, size of buttons and positions of groups of buttons is shown in FIG. 7N. In step 7N-01, randomization subsystem 7A-08 randomly selects a size of the keypad 7B-03 as described above. In step 7N-02, randomization subsystem 7A-08 randomly selects a location of the keypad 7B-03 using the process described above. In step 7N-03, randomization subsystem 7A-08 randomly selects the size of the buttons of keypad 7B-03 as described above. In step 7N-04, randomization subsystem 7A-08 randomly selects positions of groups of buttons as described above.

In some embodiments, the COTS device combines the features of the devices shown in FIGS. 2A, 2C and 7A. For example, in some embodiments, the COTS device implements the functionalities of randomization subsystem 7A-08 from FIG. 7A, and application installation controller 2C-08 shown in FIG. 2C. This enables implementation of the secure process for application installation and updating, and the randomization of the display parameters of the PIN pad for the same COTS device as described above.

One example of this disclosure includes a system to indicate to a user to enter a personal identification number (PIN) on a commercial off the shelf (COTS) device, said system comprising a secure card reader communicatively coupled to the COTS device via either a connection or a network, wherein the secure card reader receives a payment card, a payment application installed on the COTS device, and one or more devices other than the COTS device, wherein the one or more devices are communicatively coupled to the COTS device via the network; wherein the payment application installed on the COTS device transmits one or more prompts to the one or more devices other than the COTS device based on a set of signals received from the secure card reader, wherein the secure card reader transmits the set of signals after the payment card is received at the secure card reader, and wherein said one or more prompts comprise at least one indication to the user to enter the PIN on a display of the COTS device.

In one or more of the above examples, the at least one indication comprises at least one of a visual indication, an audio indication, and a motion indication.

In one or more of the above examples, the one or more devices other than the COTS device comprise the secure card reader.

In one or more of the above examples, the one or more devices other than the COTS device comprise a user device associated with the user.

In one or more of the above examples, the payment application transmits one or more prompts after a request is received from the secure card reader for the PIN.

In one or more of the above examples, the COTS device is coupled to an application store and a terminal management server (TMS) via a network, a vendor uploads the payment application to the application store, and said COTS device downloads said application via said network, and after said downloading by said terminal, said TMS authorizes said COTS device to install and run said downloaded application.

In one or more of the above examples, after said application is downloaded by said COTS device, said TMS authenticates said application.

In one or more of the above examples, prior to said upload, said vendor encrypts one or more portions of said application, and said the COTS device obtains a decryption key from said TMS to decrypt said encrypted one or more portions after said authentication and authorization.

In one or more of the above examples, said encryption is operative to either prevent exposure of said one or more portions of said application outside a trusted environment, or prevent the application from performing critical or sensitive operations in unauthorized platforms.

In one or more of the above examples, said payment application displays a PIN pad having one or more display parameters on a display of said COTS device, and said COTS device comprises a randomization subsystem to randomly select one or more variables related to at least one of one or more display parameters, wherein said one or more display parameters include a location of a keypad relative to an edge of a touchscreen, a size of said keypad, one or more sizes of one or more buttons within said keypad, and one or more positions of one or more groups of the one or more buttons within said keypad.

Another example of this disclosure includes a method to indicate to a user to enter a personal identification number (PIN) on a commercial off the shelf (COTS) device, said method comprising receiving a payment card on a secure card reader coupled to the COTS device, and transmitting, by a payment application running on the COTS device, one or more prompts to one or more devices other than the COTS device after said receiving, wherein said one or more prompts comprise at least one indication to the user to enter the PIN on a display of the COTS device.

In one or more of the above examples, the one or more devices other than the COTS device comprise either the secure card reader or a user device associated with the user.

In one or more of the above examples, the method further comprises receiving, by the COTS device, a request from the secure card reader for the PIN, wherein the transmitting of the one or more prompts occurs after the receiving of the request from the secure card reader.

In one or more of the above examples, the COTS device is coupled to an application store and a terminal management server (TMS) via a network, and the method further comprises uploading, by a vendor, the payment application to the application store, and downloading, by said COTS device, said application via said network, wherein said TMS authorizes said COTS device to install and run said downloaded application.

In one or more of the above examples, after said downloading, said TMS authenticates said application.

In one or more of the above examples, prior to said uploading, said vendor encrypts one or more portions of said application, and said COTS device obtains a decryption key from said TMS to decrypt said encrypted one or more portions after said authentication and authorization.

In one or more of the above examples, the method further comprises classifying said downloaded application into one of a plurality of classes, each of said plurality of classes corresponding to an app class sandbox, wherein said classifying is performed based on level of authorization and type of application.

In one or more of the above examples, the method further comprises uploading, by the vendor, either a patch or an upgrade to said payment application to said application store, wherein the COTS device downloads said patch or said upgrade via said network, and wherein after said downloading, said TMS authorizes said COTS device to install and run said patch or said upgrade.

In one or more of the above examples, the method further comprises displaying a PIN pad having one or more display parameters on a display of said COTS device, and randomly selecting one or more variables related to at least one of one or more display parameters, wherein said one or more display parameters comprise a location of a keypad relative to an edge of a touchscreen, a size of said keypad, one or more sizes of one or more buttons within said keypad, and one or more positions of one or more groups of the one or more buttons within said keypad.

In one or more of the above examples, said random selecting comprises either rolling up rows or flipping columns.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method to indicate to a user to enter a personal identification number (PIN), comprising:
    authenticating, by a terminal management server (TMS), a payment application downloaded by a commercial off the shelf (COTS) device from an application store, wherein one or more portions of the payment application are encrypted;
    in response to authentication, the TMS authorizing the COTS device to install and run the payment application, and sending a decryption key to the COTS device to decrypt the encrypted one or more portions of the payment application after the authorization; and
    in response to receiving payment card information from a secure card reader, transmitting, by the payment application running on the COTS device, one or more prompts to one or more devices other than the COTS device, wherein the one or more prompts comprise at least one indication to the user to enter the PIN on a display of the COTS device.

2. The method of claim 1, further comprising:
randomly selecting, by a randomization subsystem, one or more variables that adjust one or more display parameters of a PIN pad displayed by the COTS device; and
rendering, by the payment application on the display of the COTS device, the PIN pad having the one or more display parameters adjusted based on the one or more variables.

3. The method of claim 2, wherein the one or more display parameters comprise:
a location of a keypad relative to an edge of a touchscreen,
a size of the keypad,
one or more sizes of one or more buttons within the keypad, and
one or more positions of one or more groups of the one or more buttons within the keypad.

4. The method of claim 3, wherein the random selection comprises a random selection of a location variable that adjusts the location of the keypad and is based on at least one of a width and a height of the display of the COTS device.

5. The method of claim 3, wherein the random selection comprises a random selection of a location variable that adjusts the location of the keypad and is based on at least one of a horizontal gap and a vertical gap between the touchscreen and the keypad.

6. The method of claim 3, wherein the random selection comprises a random selection of a size variable that adjusts the size of the keypad based on at least one of a horizontal gap and a vertical gap between the touchscreen and the keypad.

7. The method of claim 2, wherein the randomization subsystem is comprised in the payment application.

8. The method of claim 2, wherein the randomization subsystem is comprised in the COTS device, and the payment application receives the randomly selected one or more variables from the randomization subsystem.

9. The method of claim 2, wherein the randomization subsystem performs the random selection of the one or more variables using one or more probability distributions comprising a uniform distribution and a Gaussian distribution.

10. The method of claim 1, wherein the one or more devices other than the COTS device comprise one or more of the secure card reader or a user device associated with the user, and wherein the payment application transmits the one or more prompts after a request is received from the secure card reader for the PIN.

11. The method of claim 1, wherein the payment application is classified according to a security authorization level, and wherein data access restrictions are enforced on the payment application by an operating system of the COTS device based on the security authorization level.

12. The method of claim 11, wherein the security authorization level of the payment application corresponds to an authorized payment application, and the data access restriction do not restrict the payment application access to sensitive data on the COTS device.

13. A system to indicate to a user to enter a personal identification number (PIN), comprising:
a terminal management server (TMS), communicatively coupled with a COTS device that has downloaded a payment application from an application store, wherein one or more portions of the payment application are encrypted, and the TMS is configured to:
authenticate the payment application downloaded by the COTS device,
in response to authentication, authorize the COTS device to install and run the payment application, and
send a decryption key to the COTS device to decrypt the encrypted one or more portions of the payment application after the authorization; and
the payment application is run by the COTS device and is configured to, in response to receipt of payment card information from a secure card reader, transmit one or more prompts to one or more devices other than the COTS device, wherein the one or more prompts comprise at least one indication to the user to enter the PIN on a display of the COTS device.

14. The system of claim 13, further comprising:
a randomization subsystem configured to randomly select one or more variables that adjust one or more display parameters of a PIN pad displayed by the COTS device; and
the payment application further configured to render, on the display of the COTS device, the PIN pad having the one or more display parameters adjusted based on the one or more variables.

15. The system of claim 14, wherein the one or more display parameters comprise:
a location of a keypad relative to an edge of a touchscreen,
a size of the keypad,
one or more sizes of one or more buttons within the keypad, and
one or more positions of one or more groups of the one or more buttons within the keypad.

16. The system of claim 14, wherein the randomization subsystem performs the random selection of the one or more variables using one or more probability distributions comprising a uniform distribution and a Gaussian distribution.

17. The system of claim 14, wherein the randomization subsystem is comprised in the payment application.

18. The system of claim 13, wherein the one or more devices other than the COTS device comprise one or more of the secure card reader or a user device associated with the user, and wherein the payment application transmits the one or more prompts after a request is received from the secure card reader for the PIN.

19. The system of claim 13, wherein the payment application is classified according to a security authorization level, and wherein data access restrictions are enforced on the payment application by an operating system of the COTS device based on the security authorization level.

20. The system of claim 19, wherein the security authorization level of the payment application corresponds to an authorized payment application, and the data access restriction do not restrict the payment application access to sensitive data on the COTS device.

* * * * *